US011014650B2

(12) United States Patent
Ogawa

(10) Patent No.: US 11,014,650 B2
(45) Date of Patent: May 25, 2021

(54) MOVING BODY, MOVING BODY CONTROL SYSTEM, MOVING BODY CONTROL METHOD, INTERFACE DEVICE, AND RECORDING MEDIUM HAVING PROGRAM RECORDED THEREON

(71) Applicant: NEC Corporation, Tokyo (JP)

(72) Inventor: Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 16/310,859

(22) PCT Filed: Jun. 19, 2017

(86) PCT No.: PCT/JP2017/022443
§ 371 (c)(1),
(2) Date: Dec. 18, 2018

(87) PCT Pub. No.: WO2017/221859
PCT Pub. Date: Dec. 28, 2017

(65) Prior Publication Data
US 2019/0176968 A1 Jun. 13, 2019

(30) Foreign Application Priority Data
Jun. 21, 2016 (JP) .............................. JP2016-122465

(51) Int. Cl.
*B64C 13/18* (2006.01)
*G05D 1/00* (2006.01)
(Continued)

(52) U.S. Cl.
CPC .............. *B64C 13/18* (2013.01); *B64C 19/02* (2013.01); *B64C 39/028* (2013.01); *B64D 43/02* (2013.01);
(Continued)

(58) Field of Classification Search
USPC ............................................................ 701/3
See application file for complete search history.

(56) References Cited

U.S. PATENT DOCUMENTS

2002/0194551 A1* 12/2002 Mueller .............. F02D 41/2493
714/48
2005/0197739 A1 9/2005 Noda et al.
(Continued)

FOREIGN PATENT DOCUMENTS

| JP | 2004-025971 A | 1/2004 |
| JP | 2005-199402 A | 7/2005 |

(Continued)

OTHER PUBLICATIONS

International Search Report for PCT Application No. PCT/JP2017/022443, dated Sep. 12, 2017.
(Continued)

*Primary Examiner* — Tyler D Paige
(74) *Attorney, Agent, or Firm* — Sughrue Mion, PLLC

(57) ABSTRACT

A first moving body has: a first control information generation unit for generating first control information for causing the first moving body to operate by itself; a state acquisition unit for acquiring states of the first moving body and a second moving body; a second control information generation unit for generating, on the basis of the acquired states, second control information for causing the first moving body and the second moving body to operate in a coordinated manner; a third control information generation unit for generating third control information from the first control information and the second control information; and an operation control unit for controlling operation of the first moving body in accordance with the third control information.

14 Claims, 18 Drawing Sheets

(51) Int. Cl.
  *B64D 3/02*    (2006.01)
  *B64C 19/02*   (2006.01)
  *B64C 39/02*   (2006.01)
  *B64D 43/02*   (2006.01)
  *G05D 1/12*    (2006.01)
(52) U.S. Cl.
  CPC ................ *G05D 1/00* (2013.01); *G05D 1/12* (2013.01); *B64C 2201/14* (2013.01)

(56) References Cited

U.S. PATENT DOCUMENTS

| | | | |
|---|---|---|---|
| 2006/0015215 A1 | 1/2006 | Howard et al. | |
| 2007/0078600 A1* | 4/2007 | Fregene | G08G 5/0021 |
| | | | 701/301 |
| 2009/0319101 A1 | 12/2009 | Coulmeau | |
| 2013/0035818 A1* | 2/2013 | Meitinger | B60K 6/448 |
| | | | 701/22 |
| 2015/0057844 A1 | 2/2015 | Callou et al. | |
| 2016/0368600 A1* | 12/2016 | Frolov | G05D 1/104 |
| 2018/0155021 A1* | 6/2018 | Patterson | B64C 37/02 |
| 2018/0253093 A1* | 9/2018 | Augugliaro | G05D 1/0202 |
| 2018/0354617 A1* | 12/2018 | Frolov | B64C 39/02 |
| 2019/0176968 A1* | 6/2019 | Ogawa | G05D 1/00 |
| 2019/0340136 A1* | 11/2019 | Irwin | G06F 3/0683 |
| 2019/0392091 A1* | 12/2019 | Kliemann | G06F 30/20 |
| 2020/0036609 A1* | 1/2020 | Nocon | B25J 9/0084 |

FOREIGN PATENT DOCUMENTS

| | | |
|---|---|---|
| JP | 2007-334500 A | 12/2007 |
| JP | 4617293 B2 | 1/2011 |
| JP | 4926958 B2 | 5/2012 |
| JP | 2013-060123 A | 4/2013 |
| JP | 2015-514263 A | 5/2015 |

OTHER PUBLICATIONS

English translation of Written opinion for PCT Application No. PCT/JP2017/022443.
Japanese Office Action for JP Application No. 2018-524064 dated Jan. 26, 2021 with English Translation.

* cited by examiner

Fig. 10

$g(x, y, z, x_t, y_t, z_t)$ ... EXPRESSION 1

$p_i(\phi_i)$ ... EXPRESSION 2

$p_i = 1 - e^{-\gamma_i \cdot \phi_i}$ ... EXPRESSION 3

$f_i = g(x_i, y_i, z_i, x_t, y_t, z_t) \cdot p(\phi_i)$ ... EXPRESSION 4

$\sum_i g(x_i, y_i, z_i, x_t, y_t, z_t) \cdot p(\phi_i)$ ... EXPRESSION 5

$\Psi = \sum_i \phi_i$ ... EXPRESSION 6

MOVING BODY, MOVING BODY CONTROL SYSTEM, MOVING BODY CONTROL METHOD, INTERFACE DEVICE, AND RECORDING MEDIUM HAVING PROGRAM RECORDED THEREON

This application is a National Stage Entry of PCT/JP2017/022443 filed on Jun. 19, 2017, which claims priority from Japanese Patent Application 2016-122465 filed on Jun. 21, 2016, the contents of all of which are incorporated herein by reference, in their entirety.

TECHNICAL FIELD

The present invention relates to a moving body such as an unmanned vehicle, a moving body control system, a moving body control method, an interface device, and a program.

BACKGROUND ART

Unmanned vehicles, which are a type of moving bodies, have been proposed or put into practical use in various forms. For example, PTL 1 describes a biped walking robot that autonomously operates depending on an own state and a state of an environment. Further, PTL 2 describes a rotary-wing unmanned vehicle such as a quadcopter that autonomously maintains a position thereof at a fixed point even when being swayed by a wind.

Further, systems for controlling not only a moving body as a solo unit but for controlling a group of moving bodies by treating a plurality of moving bodies as a group, have been proposed or put into practical use. For example, PTL 3 describes a control system that enables a formation flight by a plurality of moving bodies. The control system described in PTL 3 includes elements mounted on a moving body, such as a communication unit, an autopilot device for controlling an operation of the moving body as a solo unit, and a formation flight control unit for operating the own moving body in coordination with another moving body. The communication unit communicates with moving bodies that constitute a formation flight other than the own moving body. The formation flight control unit outputs, to the autopilot device, a command for enabling a formation flight in coordination with moving bodies other than the own moving body, based on information on the moving bodies other than the own moving body (such as relative positions and relative velocities) acquired through the communication unit. The autopilot device controls, in accordance with the command, control information on a moving speed, a moving direction, and the like of the own moving body, and thereby adjusts a relative position of the own moving body to another moving body to be tracked.

CITATION LIST

Patent Literature

PTL 1 Japanese Unexamined Patent Application Publication No. 2005-199402.
PTL 2 Published Japanese Translation of PCT International Publication for Patent Application No. 2015-514263.
PTL 3 Japanese Unexamined Patent Application Publication No. 2004-25971.
PTL 4 Japanese Patent No. 4617293.
PTL 5 Japanese Patent No. 4926958.

SUMMARY OF INVENTION

Technical Problem

In the above-described control system described in PTL 3, the formation flight control unit mounted on a moving body outputs a command to the autopilot device mounted on the same moving body. In other words, in the control system described in PTL 3, commands are transmitted and received between a functional part for operating the moving body as a solo unit (the autopilot device in PTL 3) and a functional part for operating a plurality of moving bodies in coordination with one another (the formation flight control unit in PTL 3). Therefore, when there are a plurality of moving bodies operable as solo units and functional parts mounted on the respective moving bodies for operating as solo units are different from one another, then the functional part for operating a plurality of moving bodies in coordination with one another needs to be designed individually according to the functional part for operating the moving body as a solo unit. There is no general technique at present of integrating determination in a functional part for operating a moving body as a solo unit and determination in a functional part for operating a plurality of moving bodies in coordination with one another, and hence the functional parts need to be designed individually. Such a problem arises also when a group of a plurality of moving bodies is controlled by using a functional part of a kind different from the autopilot device for operating a moving body as a solo unit, such as a stabilization device for flying a moving body in a stable condition regardless of a flight condition. Further, such a problem arises not only on a flying body that autonomously flies in the air but also on a car that autonomously runs on a road, and an underwater vehicle that autonomously travels underwater.

An object of the present invention is to provide a moving body, a moving body control system, a moving body control method, an interface, and a program that solve the above-described problem, i.e., the problem that a functional part for operating a plurality of moving bodies in coordination with one another needs to be designed individually according to a functional part for operating a moving body as a solo unit.

Solution to Problem

A moving body being a first moving body, according to one aspect of the present invention, includes: first control information generation means for generating first control information for operating the first moving body as a solo unit; state acquisition means for acquiring states of the first moving body and at least one second moving body; second control information generation means for generating second control information for operating the first moving body in coordination with the at least one second moving body, based on the acquired states; third control information generation means for generating third control information from the first control information and the second control information; and operation control means for controlling an operation of the first moving body in accordance with the third control information.

A moving body control method being a method of controlling a first moving body, according to another aspect of the present invention, includes: generating first control information for operating the first moving body as a solo unit; acquiring states of the first moving body and a second moving body; generating second control information for operating the first moving body in coordination with the second moving body, based on the acquired states; generating third control information from the first control information and the second control information; and controlling an operation of the first moving body in accordance with the third control information.

A moving body according to another aspect of the present invention includes a first interface for outputting first control information for operating the moving body as a solo unit, to an outside of the moving body.

A program, according to another aspect of the present invention, that causes a computer mounted on a first moving body to execute a function as: a first control information generation unit configured to generate first control information for operating the first moving body as a solo unit; a state acquisition unit configured to acquire states of the first moving body and at least one second moving body; a second control information generation unit configured to generate second control information for operating the first moving body in coordination with the at least one second moving body, based on the acquired states; a third control information generation unit configured to generate third control information from the first control information and the second control information; and an operation control unit configured to control an operation of the first moving body in accordance with the third control information.

An interface device of a moving body, according to another aspect of the present invention, includes a first interface for outputting first control information for operating the moving body as a solo unit, to an outside of the moving body.

A moving body control system for controlling a first moving body, according to another aspect of the present invention, includes: a first control information generation unit configured to generate first control information for operating the first moving body as a solo unit; a state acquisition unit configured to acquire states of the first moving body and at least one second moving body; a second control information generation unit configured to generate second control information for operating the first moving body in coordination with the second moving body, based on the acquired states; a third control information generation unit configured to generate third control information from the first control information and the second control information; and an operation control unit configured to control an operation of the first moving body in accordance with the third control information.

Advantageous Effects of Invention

According to the present invention, with the above-described configuration, a functional part for operating a plurality of moving bodies in coordination with one another does not need to be designed individually according to a functional part for operating a moving body as a solo unit.

BRIEF DESCRIPTION OF DRAWINGS

FIG. 10 is a diagram illustrating expressions used in the control system according to the first example embodiment of the present invention.

EXAMPLE EMBODIMENT

Figure 1:
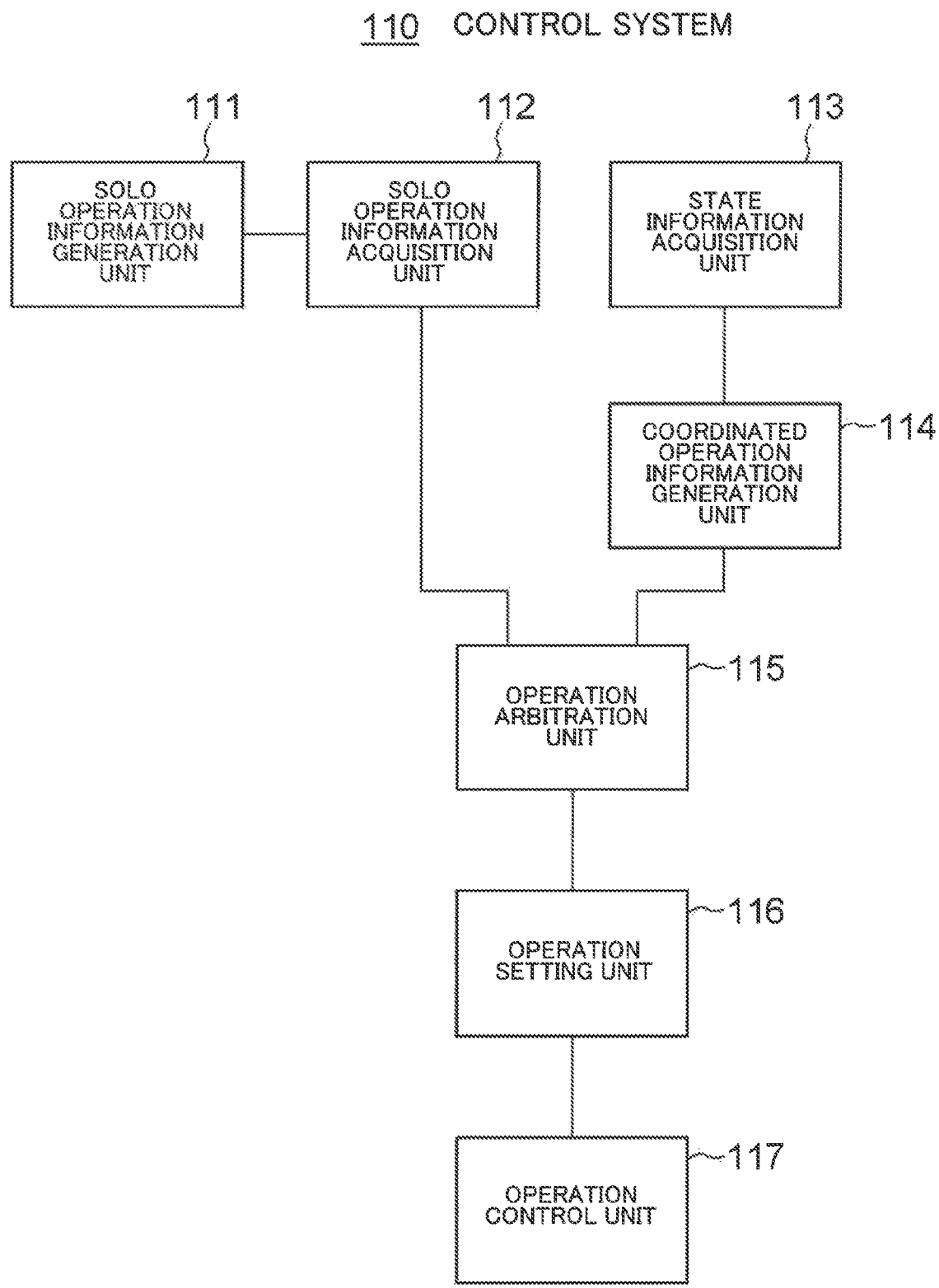
FIG. 1 is a block diagram of a control system according to a first example embodiment of the present invention.

Next, example embodiments of the present invention will be described in detail with reference to the drawings.

First Example Embodiment

In the present example embodiment, a moving body control system and moving bodies for operating a plurality of moving bodies in coordination and thereby causing them to behave in an efficient formation or to search a target efficiently will be described.

Background Art of the Present Example Embodiment

In recent years, many applications of unmanned vehicles, which are as one of the moving bodies, have been proposed.

Disc-shaped robots that automatically clean a room and home delivery services by unmanned vehicles that fly in the air (called drones) are such examples. Robots used in a dangerous environment such as in a nuclear power plant are further examples.

Normally, one unmanned vehicle is used in these examples. On the other hand, applications using a plurality of unmanned vehicles have also been proposed. For example, PTL 4 describes an application example in which a plurality of load-carrying robots are used in an e-commerce factory and the goods ordered by customers are collected speedily. Further, PTL 5 describes an application example in which a plurality of unmanned vehicles are used for searching a search target.

In particular, the application of a plurality of unmanned vehicles for searching a search target is vigorously studied as defense-related technology. An unmanned vehicle is generally called a UxV (Unmanned x Vehicle). For example, an unmanned airplane is called UAV (Unmanned Air Vehicle), an unmanned ship is called USV (Unmanned Surface Vehicle), an unmanned underwater vessel is called UUV (Unmanned Undersea Vehicle), and an unmanned car is called UGV (Unmanned Ground Vehicle).

The unmanned vehicles as described above can be classified into two types, i.e., those remotely operated by humans and those that autonomously behave according to an installed program. Still, the target of the technical development is those that autonomously behave according to an installed program as much as possible. An unmanned vehicle or a group of unmanned vehicles that will perform various behaviors or labor in place of humans is desired. One of the reasons for vigorous studies on artificial intelligence in recent years is an expectation for wise autonomous operation of an unmanned vehicle that could be enabled by installing better artificial intelligence.

As described above, extensive studies have been made for an unmanned vehicle as a solo unit and a group of a plurality of unmanned vehicles. Then, in applications for controlling a group of unmanned vehicles, the control algorithm for coordinated operation of the group of unmanned vehicles is created on the assumption that the operating characteristics of each unmanned vehicle as a solo unit are known. In other words, the control algorithm is developed after the decision has been taken as to the type of the unmanned vehicles and the application of a group of unmanned vehicles. Therefore, it has been necessary to specially develop a control algorithm for coordinated operation of the group of unmanned vehicles depending on the type of the unmanned vehicles.

However, recent years have seen more and more cases in which a control algorithm for autonomous behaviors is installed in each unmanned vehicle as a solo unit, and the prices are falling every year. In view of this situation, it is more economically rational to purchase commercially available unmanned vehicles at a low price and develop an application using a group of unmanned vehicles than to specially develop a control algorithm for coordinated operation of the group of unmanned vehicles on the assumption that the operating characteristics of each unmanned vehicle as a solo unit are known. Further, it is reasonable to assume that the application once made for the group of unmanned vehicles will be altered when some of the unmanned vehicles are replaced with those of a cheaper, different type during operation or when a plurality of types of unmanned vehicles are mixed.

However, there is no effective platform on which an application for a group of unmanned vehicles by combining unmanned vehicles having a control algorithm for autonomous operation can be developed in a simple manner irrespective of any types of the unmanned vehicles.

Technical Problem to be Solved by the Present Example Embodiment

As described above, unmanned vehicles have become capable of autonomous operation as solo units and various kinds of autonomously operable unmanned vehicles have become commercially available. However, it is difficult to make an application for a group of unmanned vehicles, while combining such unmanned vehicle operable as solo units and utilizing the autonomous operation functions of the unmanned vehicle operable as solo units. The present example embodiment serves to solve such a difficulty and proposes a control system, an unmanned vehicle, or an interface that allows an easy development of an application for a group of unmanned vehicles to be combined with various kinds of unmanned vehicles operable as solo units.

Details of the Present Example Embodiment

Figure 2:
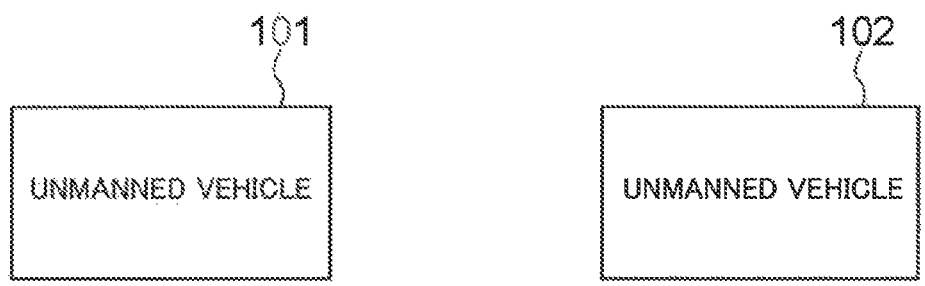
FIG. 2 is a diagram illustrating a plurality of unmanned vehicles controlled by the control system according to the first example embodiment of the present invention.

FIG. 1 is a block diagram of a control system 110 according to the present example embodiment. There is one to one correspondence between control systems 110 and unmanned vehicles. In other words, when there are a plurality of unmanned vehicles 101, 102, as illustrated in FIG. 2, one control system 110 corresponds to the unmanned vehicle 101 and another control system 110 corresponds to the unmanned vehicle 102. In the following, an explanation will be made assuming that the control system 110 in FIG. 1 corresponds to the unmanned vehicle 101. Note that, although two unmanned vehicles are illustrated in FIG. 2, the number of unmanned vehicles that perform coordinated operation is not limited to two and may be three or more.

With reference to FIG. 1, the control system 110 includes a solo operation information generation unit 111, a solo operation information acquisition unit 112, a state information acquisition unit 113, a coordinated operation information generation unit 114, an operation arbitration unit 115, an operation setting unit 116, and an operation control unit 117.

The solo operation information generation unit 111 has a function of generating an operation setting value for operating the unmanned vehicle 101 as a solo unit. The solo operation information generation unit 111 is also referred to as a first control information generation unit and the operation setting value is also referred to as first control information. The solo operation information generation unit 111 is in the unmanned vehicle 101. The solo operation information generation unit 111 is actualized by an arithmetic processing unit such as a CPU and a program executed by the arithmetic processing unit. Alternatively, the solo operation information generation unit 111 may be actualized by a dedicated LSI.

The operation setting value determined by the unmanned vehicle 101 as a solo unit is an operation setting value for the unmanned vehicle 101 when it operates as a solo unit. In the case of a drone, for example, the operation setting value may mean a moving speed in the forward, backward, rightward, leftward, upward, and downward direction and the like. Further, in the case of a car, it may mean a target steering angle and a breaking force. The operation setting value is ultimately converted to a voltage value, current value, or torque value at which the driving parts of the unmanned vehicle 101 (the actuator such as a motor for rotating a propeller or an electric power steering motor for rotating the steering) are operated.

Generally, unmanned vehicles operable as solo units are often configured to perform a certain autonomous operation. An example of a certain autonomous operation is an unmanned vehicle making a move to avoid an obstacle when it has found the obstacle. Another example of an autonomous operation is an unmanned vehicle making a move toward a target for recognition when it has found the target. Yet another example of an autonomous operation is an unmanned vehicle making a move toward the original position when it has been swayed by a wind, a wave, or the like. The solo operation information generation unit 111 of the unmanned vehicle, which performs a plurality of types of autonomous operations as described above, generates an operation setting value Ai and its importance ki for each operation type i and outputs the operation setting value Ai and the importance ki to the solo operation information acquisition unit 112.

Note that, generally speaking, an unmanned vehicle that performs autonomous operation has a device for recognizing its surrounding environment, a device for detecting its movement, and a device for detecting its position although no such device is illustrated in FIG. 1. For example, the device for recognizing the environment of the unmanned vehicle is constituted by devices such as a camera device to capture images of the external environment and an image processing device to extract data of 3D objects and the like outside, based on the captured images, and to detect the relative position together with the velocity of the unmanned vehicle relative to the 3D object data and the like. Further, the device for detecting the movement of the unmanned vehicle is constituted by devices such as sensors to detect movement speed and acceleration. Further, the device for detecting the position of the unmanned vehicle is constituted by devices such as, for example, a sensor to detect the present position by receiving radio waves transmitted by a GPS (Global Positioning System) satellite.

The importance ki takes a value not smaller than 0 and not greater than 1. For example, with respect to the operation setting value Ai for making a move to avoid an obstacle when the unmanned vehicle has found the obstacle, the solo operation information generation unit 111 sets the importance ki at the maximum, i.e., 1 when the unmanned vehicle is about to crash into the obstacle, and sets the importance ki at a value smaller than 1 when there is time allowed for avoiding a crash, the value being set in reverse proportion to the time allowed. Similarly, the solo operation information generation unit 111 generates and outputs an operation setting value Ai and an importance ki for such a type of autonomous operation as making a move toward a target for recognition when the target has been found, and for such a type of autonomous operation as making a move toward the original position when the unmanned vehicle has been swayed by a wind, a wave, or the like.

Alternatively, the solo operation information generation unit 111 of an unmanned vehicle that performs a plurality of types of autonomous operations may be configured to generate an operation setting value Ai and its importance ki for each operation type i and to output a final operation setting value that incorporates these. For example, the solo operation information generation unit 111 may be configured to multiply the operation setting value Ai by the importance ki for each operation type i and to output a value $A=\Sigma Ai \cdot ki$, obtained by summing up all the multiplication results, as a final operation setting value.

Alternatively, the solo operation information generation unit 111 of an unmanned vehicle that performs one type of autonomous operation may be configured to output one type of operation setting value A.

Further, the solo operation information generation unit 111 may be configured to output an importance α for the solo operation. For example, the solo operation information generation unit 111 may output an importance α of the solo operation in addition to the operation setting value Ai and its importance ki for each operation type i. Alternatively, the solo operation information generation unit 111 may output an importance α of the solo operation in addition to the final operation setting value A that incorporates the operation setting value Ai and its importance ki for each operation type i. Alternatively, the solo operation information generation unit 111 may output one type of operation setting value A and an importance a of the solo operation. A maximum value of the importance ki, for example, may be used as the importance α of the solo operation.

The solo operation information acquisition unit 112 is a means for transmitting the information outputted by the solo operation information generation unit 111 to the operation arbitration unit 115. The operation arbitration unit 115 may be designed to be in the unmanned vehicle 101 or may be designed to be in an information processing device at a location geographically remote from the unmanned vehicle 101. The configuration of the solo operation information acquisition unit 112 varies according to this difference in design.

Figure 3:
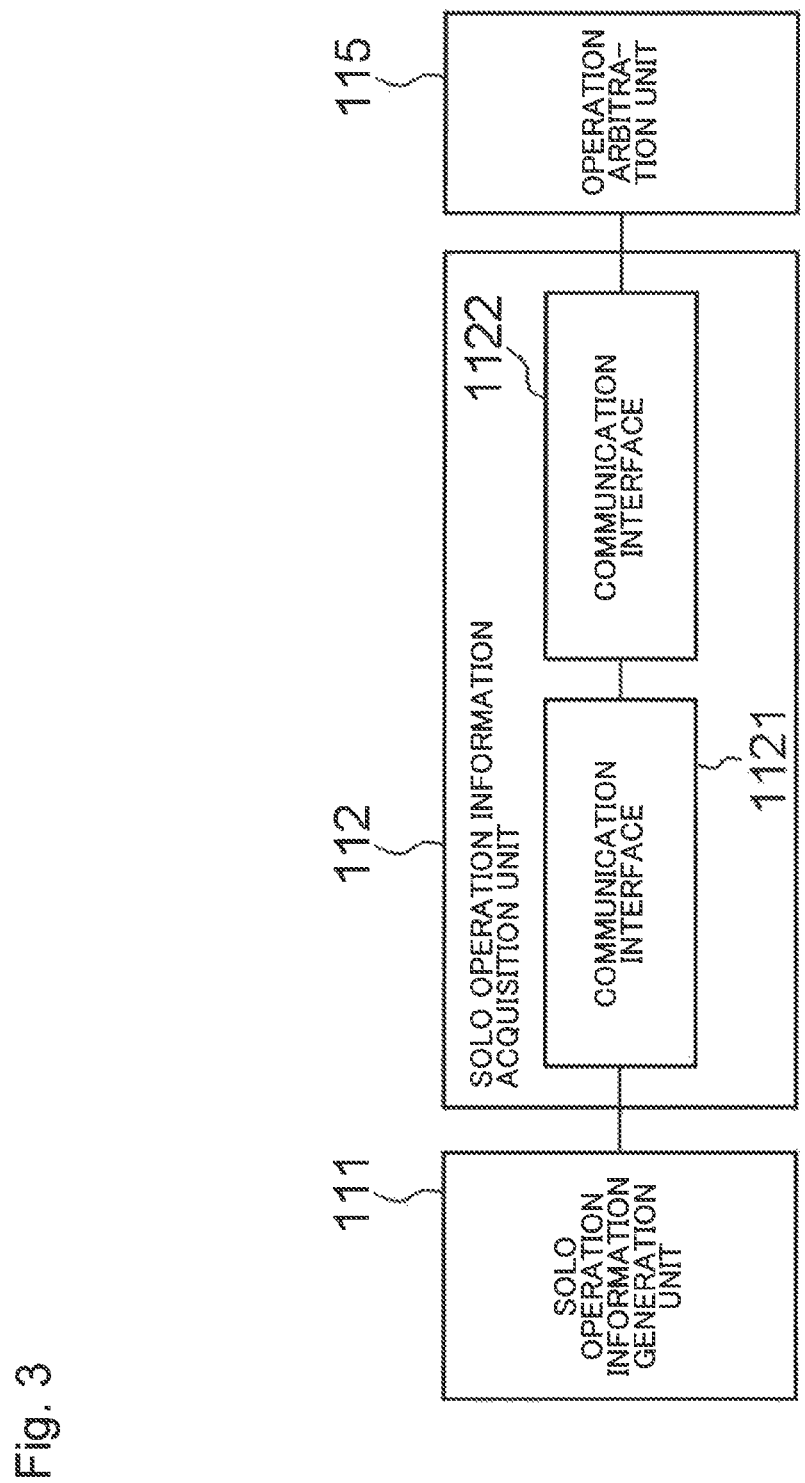
FIG. 3 is a block diagram illustrating an example configuration of the solo operation information acquisition unit of the control system according to the first example embodiment of the present invention.

FIG. 3 is a block diagram illustrating an example configuration of the solo operation information acquisition unit 112. The solo operation information acquisition unit 112 in this example is configured by communication interfaces 1121, 1122. The communication interface 1121 is in the unmanned vehicle 101 having a solo operation information generation unit 111 and has a function of receiving the information outputted by the solo operation information generation unit 111 and transmitting the information to the communication interface 1122 by wireless communication. The communication interface 1121 is in an information processing device at a location geographically remote from the unmanned vehicle 101 and has a function of receiving the information outputted by the solo operation information generation unit 111 from the communication interface 1122 by wireless communication and outputting the information to the operation arbitration unit 115 provided in the information processing device.

Figure 4:
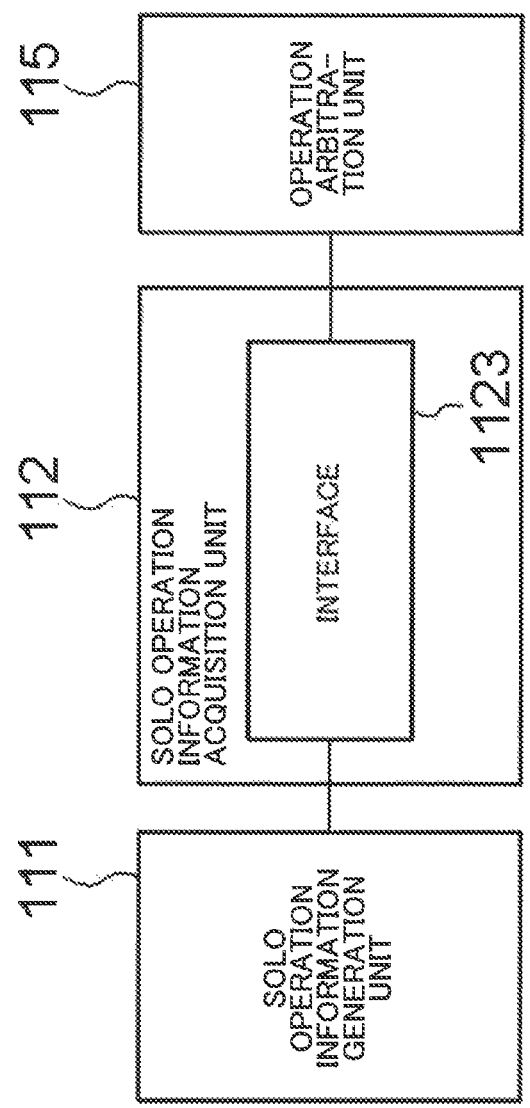
FIG. 4 is a block diagram illustrating another example configuration of the solo operation information acquisition unit of the control system according to the first example embodiment of the present invention.

FIG. 4 is a block diagram illustrating another example configuration of the solo operation information acquisition unit 112. The solo operation information acquisition unit 112 in this example is configured by an interface 1123. The interface 1123 is in the unmanned vehicle 101 having a solo operation information generation unit 111 and has a function of receiving the information outputted by the solo operation information generation unit 111 and transmitting the information to the operation arbitration unit 115 in the unmanned vehicle 101. The interface 1123 may be configured to include: a register that temporarily holds the information outputted by the solo operation information generation unit 111 and outputs the information to the operation arbitration unit 115; and a connector and a connecting switch that connect the output terminal of the solo operation information generation unit 111 with the input terminal of the operation arbitration unit 115. Alternatively, the interface 1123 may be configured by an API (Application Program Interface) that acquires the information outputted by the solo operation information generation unit 111.

Referring to FIG. 1 again, the state information acquisition unit 113 has a function of acquiring a state of the unmanned vehicle 101 and a state of the unmanned vehicle 102 that operates in coordination with the unmanned vehicle 101 and transmitting the acquired states to the coordinated operation information generation unit 114. The states of the unmanned vehicles 101 and 102 that the state information acquisition unit 113 acquires vary depending on the types and objectives of the coordinated operation. For example, when the coordinated operation is a formation flight by a plurality of unmanned vehicles, the state information acquisition unit 113 acquires the position information and the speed information of the own vehicle and other vehicles. Further, for example, when the coordinated operation is the searching or tracking of a search target, the state information acquisition unit 113 acquires an evaluation function value and the position of the search target in addition to the positions of the own vehicle and other vehicles, as will be described later.

The state information acquisition unit 113 may be designed in such a way that the state information acquisition unit 113 is entirely in the unmanned vehicle 101 or in such a way that a part of the state information acquisition unit 113 is in the unmanned vehicle 101 and the other part is in an information processing device at a location geographically remote from the unmanned vehicle 101.

Figure 5:
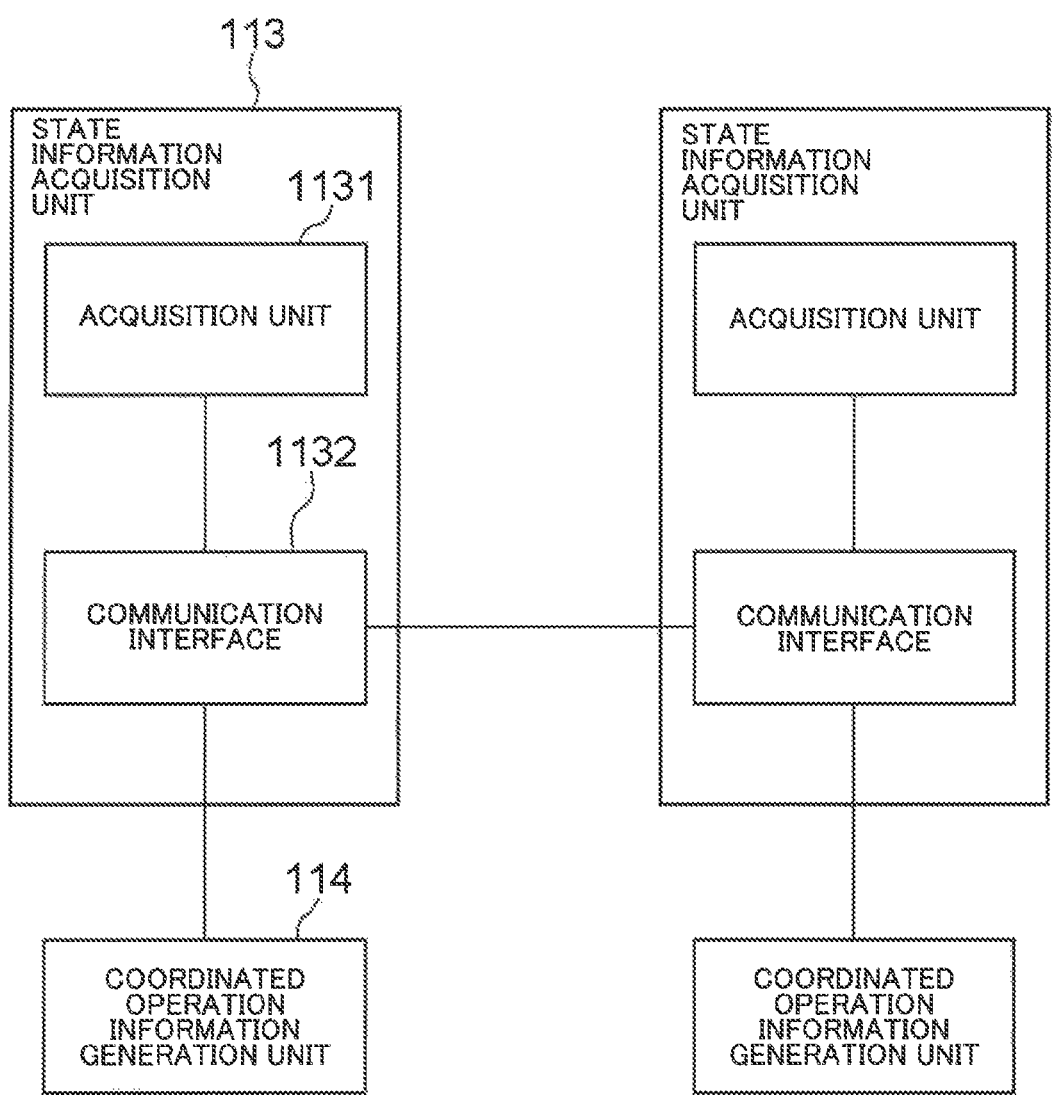
FIG. 5 is a block diagram illustrating an example configuration of the state information acquisition unit of the control system according to the first example embodiment of the present invention.

FIG. 5 is a block diagram illustrating an example configuration of the state information acquisition unit 113. The state information acquisition unit 113 in this example is configured by an acquisition unit 1131 that is in the unmanned vehicle 101 and a communication interface 1132. The acquisition unit 1131 has a function of acquiring a state of the unmanned vehicle 101. The communication interface 1132 has a function of transmitting the state of the unmanned vehicle 101 acquired by the acquisition unit 1131 to the coordinated operation information generation unit 114 in the unmanned vehicle 101. Further, the communication interface 1132 has a function of acquiring a state of the unmanned vehicle 102 by communicating with the communication interface of the state information acquisition unit in the unmanned vehicle 102 and transmitting the acquired state to the coordinated operation information generation unit 114.

Figure 6:
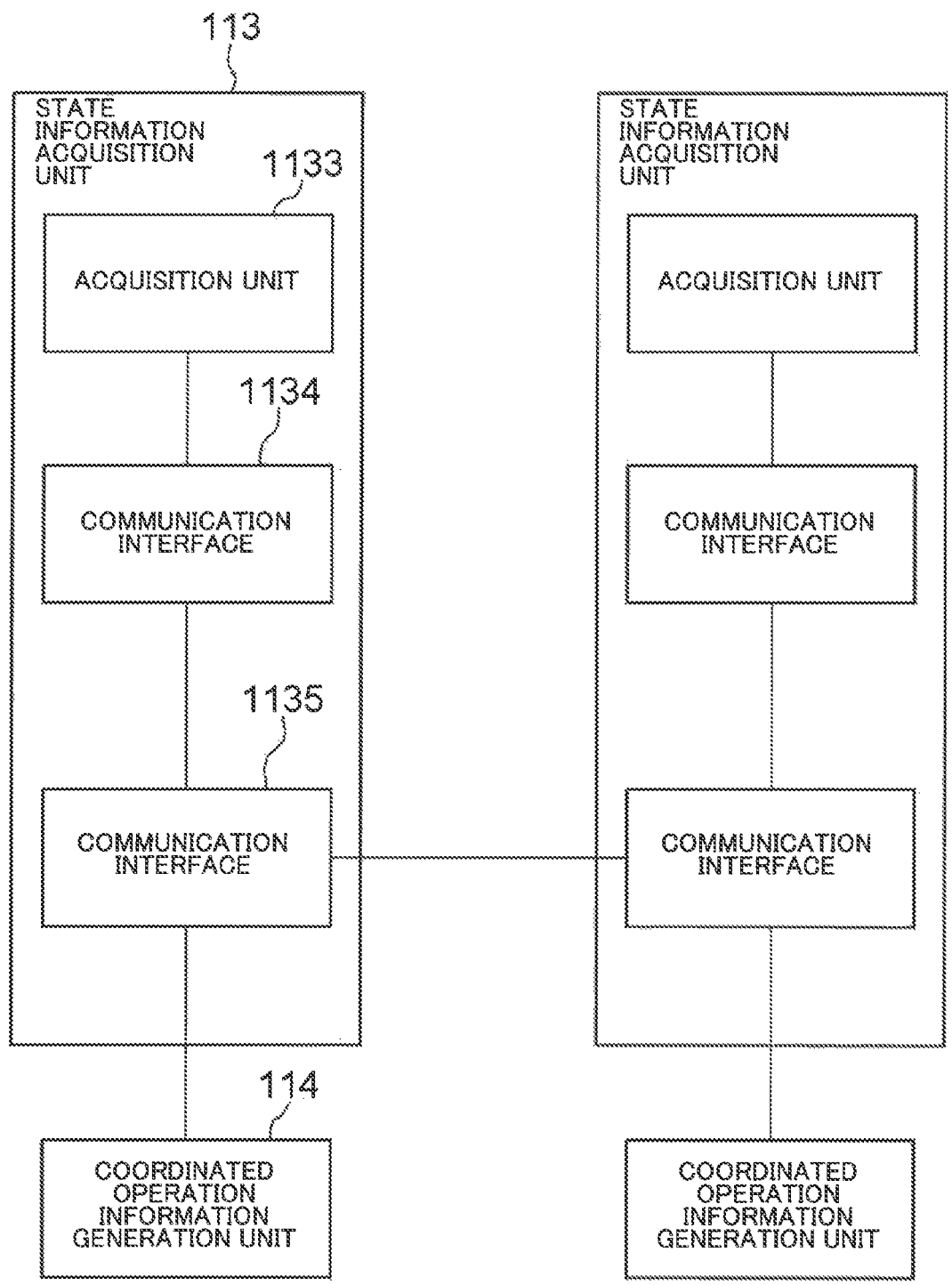
FIG. 6 is a block diagram illustrating another example configuration of the state information acquisition unit of the control system according to the first example embodiment of the present invention.

FIG. 6 is a block diagram illustrating another example configuration of the state information acquisition unit 113. The state information acquisition unit 113 in this example is configured by an acquisition unit 1133 in the unmanned vehicle 101, a communication interface 1134 in the unmanned vehicle 101, and a communication interface 1135 in an information processing device at a location geographically remote from the unmanned vehicle 101. The acquisition unit 1133 has a function of acquiring a state of the unmanned vehicle 101. The communication interface 1134 has a function of transmitting the state of the unmanned vehicle 101 acquired by the acquisition unit 1133 to the communication interface 1135. The communication interface 1135 has a function of transmitting the state of the unmanned vehicle 101 received from the communication interface 1134 to the coordinated operation information generation unit 114 in the information processing device. Further, the communication interface 1135 has a function of acquiring a state of the unmanned vehicle 102 by communicating with the communication interface of the state information acquisition unit in the unmanned vehicle 102 and transmitting the acquired state to the coordinated operation information generation unit 114.

The coordinated operation information generation unit 114 has a function of generating an operation setting value for operating the unmanned vehicle 101 in coordination with the unmanned vehicle 102, based on the state of the unmanned vehicle 101 and the state of the unmanned vehicle 102 acquired by the state information acquisition unit 113. The coordinated operation information generation unit 114 may be designed to be in the unmanned vehicle 101 or may be designed to be in an information processing device at a location geographically remote from the unmanned vehicle 101. The operation setting value has the same meaning as the operation setting value that the solo operation information generation unit 111 generates. The coordinated operation information generation unit 114 is also referred to as a second control information generation unit and the operation setting value is also referred to as second control information.

When a plurality of types of coordinated operations are performed, the coordinated operation information generation unit 114 generates an operation setting value Bj and its importance kj for each operation type j and outputs the operation setting value Bj and its importance kj to the operation arbitration unit 115. The importance kj takes a value not smaller than 0 and not greater than 1. Alternatively, the coordinated operation information generation unit 114 of an unmanned vehicle that performs a plurality of types of coordinated operations may be configured to generate an operation setting value Bj and its importance kj for each operation type j and to output a final operation setting value that incorporates these. For example, the coordinated operation information generation unit 114 may be configured to multiply the operation setting value Bj by the importance kj for each operation type j and to output a value $B=\Sigma Bj \cdot kj$, obtained by summing up all the multiplication results, as a final operation setting value. Alternatively, the coordinated operation information generation unit 114 of an unmanned vehicle that performs one type of coordinated operation may be configured to output one type of operation setting value B.

Further, the coordinated operation information generation unit 114 may be configured to output an importance β for the coordinated operation. For example, the coordinated operation information generation unit 114 may output an importance β of the coordinated operation in addition to the operation setting value Bj and its importance kj for each operation type j. Alternatively, the coordinated operation information generation unit 114 may output an importance β of the coordinated operation in addition to the final operation setting value B that incorporates the operation setting value Bj and its importance kj for each operation type j. Alternatively, the coordinated operation information generation unit 114 may output one type of operation setting value B and an importance β of the coordinated operation. A maximum value of the importance kj, for example, may be used as the importance β of the coordinated operation.

The operation arbitration unit 115 has a function of determining a final operation setting value, based on the information outputted from the solo operation information generation unit 111 through the solo operation information acquisition unit 112 and the information outputted by the coordinated operation information generation unit 114. The operation setting value has the same meaning as the operation setting values generated by the solo operation information generation unit 111 and the coordinated operation information generation unit 114. The operation arbitration unit 115 is also referred to as a third control information generation unit and the final operation setting value is also referred to as third control information.

The operation arbitration unit 115 determines the final operation setting value as, for example, $\alpha A+\beta B$, based on the operation setting value A for the unmanned vehicle 101 operating as a solo unit and the importance $\alpha$ of the solo operation that are determined by the information outputted by the solo operation information generation unit 111 and on the operation setting value B for the unmanned vehicle 101 in coordinated operation and the importance $\beta$ of the coordinated operation that are determined by the information outputted by the coordinated operation information generation unit 114.

The operation setting unit 116 is a means for transmitting the information outputted by the operation arbitration unit 115 to the operation control unit 117. The operation control unit 117 is in the unmanned vehicle 101. Meanwhile, the operation arbitration unit 115 may be designed to be in the unmanned vehicle 101 or in a location geographically remote from the unmanned vehicle 101, as described above. The configuration of the operation setting unit 116 varies according to this difference in design.

Figure 7:
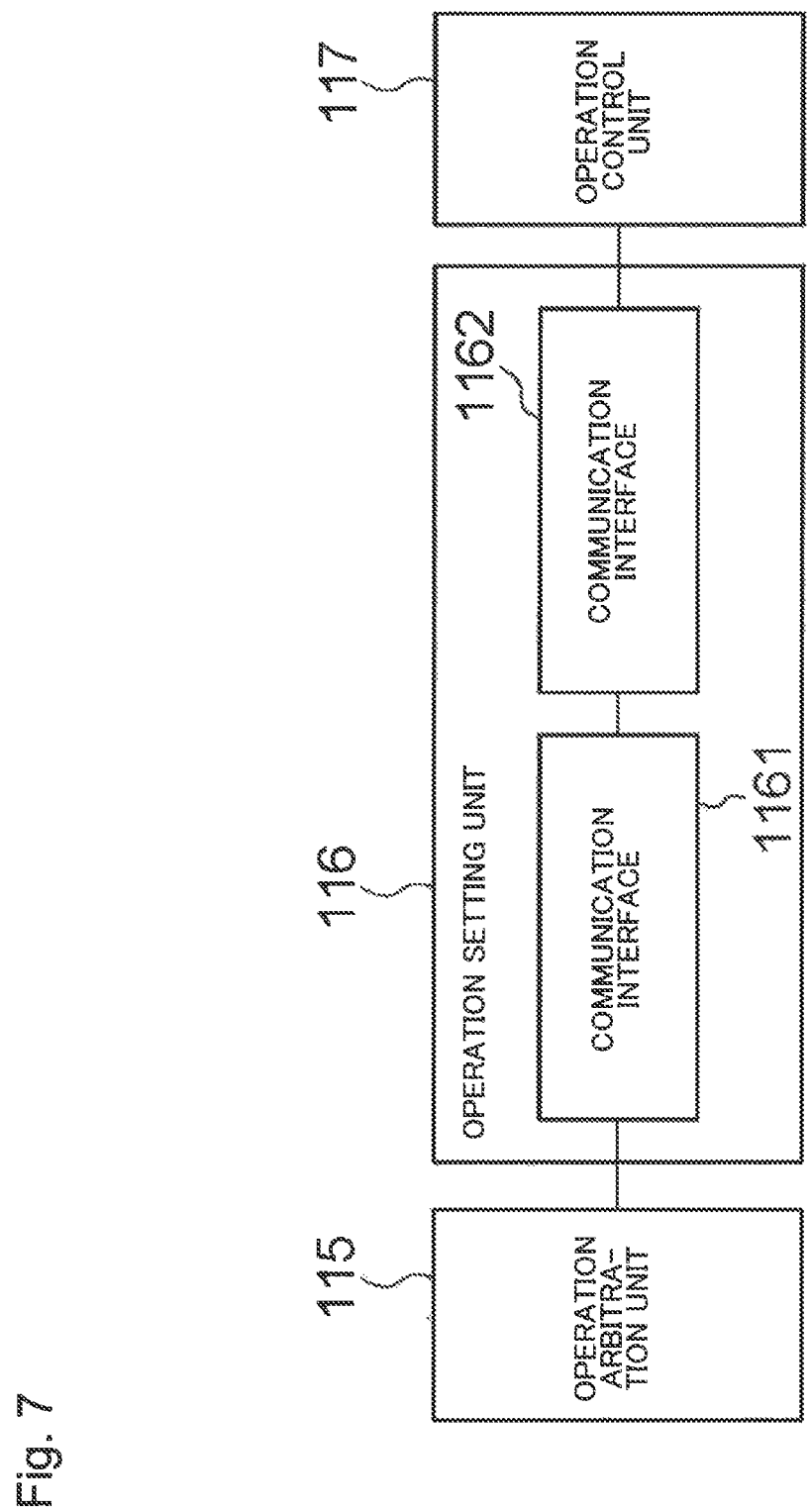
FIG. 7 is a block diagram illustrating an example configuration of the operation setting unit of the control system according to the first example embodiment of the present invention.

FIG. 7 is a block diagram illustrating an example configuration of the operation setting unit 116. The operation setting unit 116 in this example is configured by communication interfaces 1161 and 1162. The communication interface 1161 is in an information processing device having an operation arbitration unit 115 and has a function of receiving the information outputted by the operation arbitration unit 115 and transmitting the information to the communication interface 1162 by wireless communication. The communication interface 1162 is in the unmanned vehicle 101 having the operation control unit 117 and has a function of receiving the information outputted by the operation arbitration unit 115 from the communication interface 1161 by wireless communication and outputting the information to the operation control unit 117.

Figure 8:
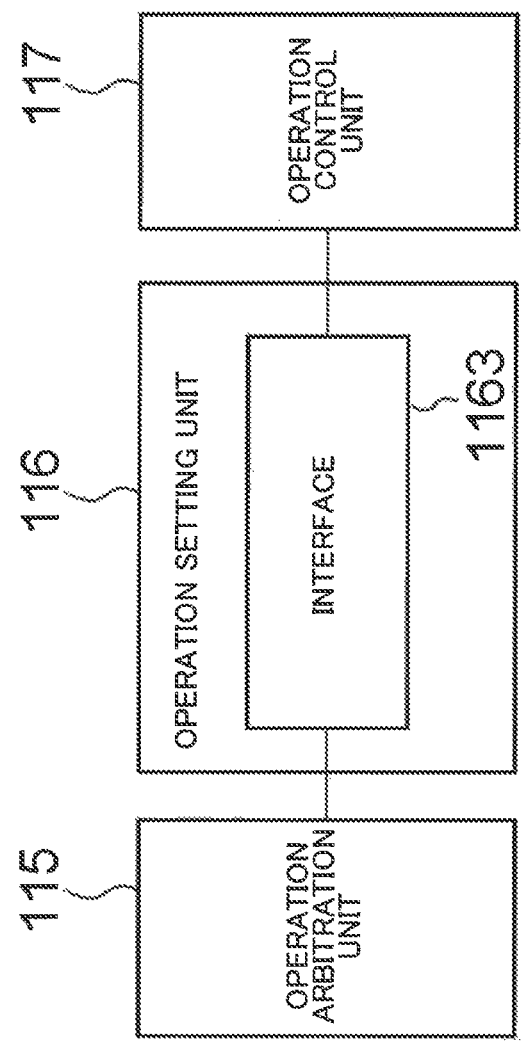
FIG. 8 is a block diagram illustrating another example configuration of the operation setting unit of the control system according to the first example embodiment of the present invention.

FIG. 8 is a block diagram illustrating another example configuration of the operation setting unit 116. The operation setting unit 116 in this example is configured by an interface 1163. The interface 1163 is in the unmanned vehicle 101 having the operation arbitration unit 115 and has a function of receiving the information outputted by the operation arbitration unit 115 and transmitting the information to the operation control unit 117 in the unmanned vehicle 101. The interface 1163 may be configured to include: a register that temporarily holds the information outputted by the operation arbitration unit 115 and outputs the information to the operation control unit 117; and a connector and a connecting switch that connect the output terminal of the operation arbitration unit 115 with the input terminal of the operation control unit 117. Alternatively, the interface 1163 may be configured by an API (Application Program Interface) that acquires the information outputted by the operation arbitration unit 115.

The operation control unit 117 has a function of controlling the operation of the unmanned vehicle 101 in accordance with the information inputted by way of the operation setting unit 116 and outputted by the operation arbitration unit 115. In the case of a drone, for example, the operation setting value, which is the information outputted by the operation arbitration unit 115, means a moving speed in the forward, backward, rightward, leftward, upward, and downward direction and the like. Therefore, when the unmanned vehicle 101 is a drone, the operation control unit 117 controls the operation of the unmanned vehicle 101 (throttle, pitch, roll, and yaw) by controlling each rotation rate of the plurality of motors that rotate a plurality of propellers in accordance with operation setting values such as moving speed in the forward, backward, rightward, leftward, upward, and downward direction and the like. Further, when the unmanned vehicle 101 is an unmanned car, the operation setting value, which is the information outputted by the operation arbitration unit 115, means a target steering angle and the like. Therefore, when the unmanned vehicle 101 is an unmanned car, the operation control unit 117 controls the steering angle and the like by the electric power steering motor that rotates the steering.

Figure 9:
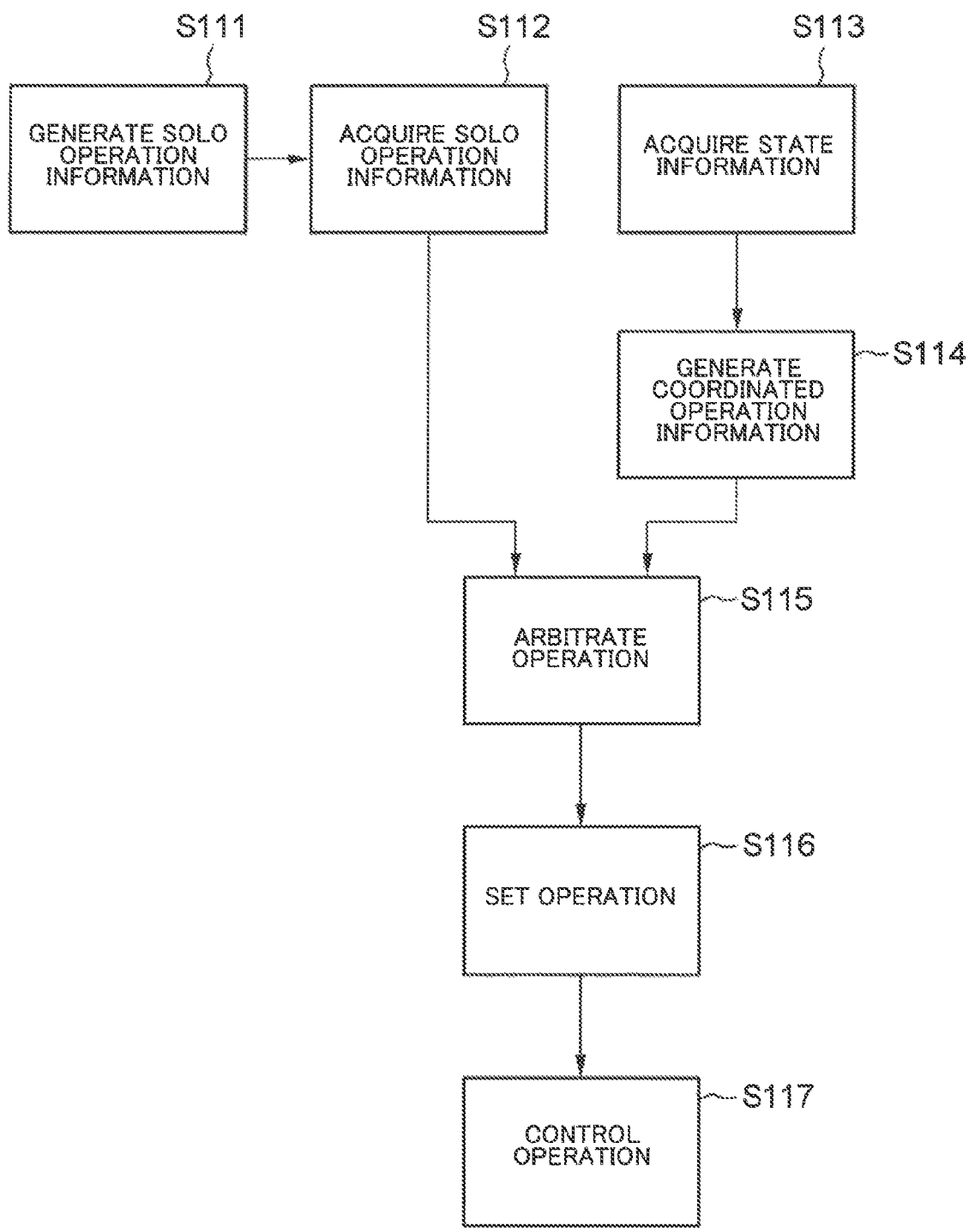
FIG. 9 is a flow chart for illustrating an operation of the control system according to the first example embodiment of the present invention.

FIG. 9 is a flow chart for illustrating an operation of the control system 110. The operation of the control system 110 controlling the unmanned vehicle 101 will be described below with reference to FIG. 9.

The solo operation information generation unit 111 of the control system 110 generates an operation setting value Ai and its importance ki for operating the unmanned vehicle 101 as a solo unit (step S111). Next, the solo operation information acquisition unit 112 acquires the operation setting value Ai and its importance ki from the solo operation information generation unit 111 and transmits the operation setting value Ai and the importance ki to the operation arbitration unit 115 (step S112).

Meanwhile, the state information acquisition unit 113 acquires a state of the unmanned vehicle 101 and a state of the unmanned vehicle 102 (step S113). Next, the coordinated operation information generation unit 114 generates an operation setting value Bj and its importance kj for operating the unmanned vehicle 101 in coordination with the unmanned vehicle 102, based on the acquired sates, and transmits the operation setting value Bj and the importance kj to the operation arbitration unit 115 (step S114).

The operation arbitration unit 115 generates a final operation setting value based on the operation setting value Ai and the importance ki generated by the solo operation information generation unit 111 for operating the unmanned vehicle 101 as a solo unit and the operation setting value Bj and the importance kj generated by the coordinated operation information generation unit 114 for operating the unmanned vehicle 101 in coordination with the unmanned vehicle 102 (step S115). Next, the operation setting unit 116 transmits the final operation setting value to the operation control unit 117 (step S116). Next, the operation control unit 117 controls the operation of the unmanned vehicle 101 according to the final operation setting value (step S117).

Steps S111 to S117 are repeatedly executed at a predetermined interval.

As described above, in the control system 110 according to the present example embodiment, the solo operation information generation unit 111, which is the functional part for operating the unmanned vehicle 101 as a solo unit, and the coordinated operation information generation unit 114, which is the functional part for operating the unmanned vehicle 101 in coordination with other unmanned vehicles, are independent of each other. Thus, the coordinated operation information generation unit 114 can be designed independently of the solo operation information generation unit 111. Therefore, even when there are a plurality of unmanned vehicles operable as solo units and each of the solo operation information generation units 111, which is the functional part mounted on each of the unmanned vehicles for solo operation, is designed differently between each other, it is not necessary to design the coordinated operation information generation unit 114 individually according to each solo operation information generation unit 111.

Next, the control system 110 according to the present example embodiment will be described more in detail focusing on the state information acquisition unit 113 and the coordinated operation information generation unit 114.

Now, an application will be considered in which an objective is given to a plurality of unmanned vehicles and a value is to be maximized. In other words, a system for operating a group of unmanned vehicles that achieves an objective while maximizing a value by the unmanned vehicles as a whole will be considered. The state information acquisition unit 113 of the control system 110 acquires, from a neighboring unmanned vehicle with which to perform coordinated operation, an evaluation value relating to an objective of the plurality of unmanned vehicles as a whole (also referred to as evaluation function) or ancillary information, which is ancillary thereto, as the information on the state of the unmanned vehicle. The coordinated operation information generation unit 114 of the control system 110 determines how to operate as a group of a plurality of unmanned vehicles as a whole by using the evaluation value relating to an objective of the plurality of unmanned vehicles as a whole or its ancillary information.

How to actually coordinate a group of unmanned vehicles will be described below and what an evaluation value relating to an objective of the plurality of unmanned vehicles as a whole is will be clarified in concrete terms.

Since what is to be maximized by a plurality of unmanned vehicles as a whole is often the search probability of a search target, the description will be made assuming that the objective of the plurality of unmanned vehicles as a whole (the value to be maximized as a whole) is the search probability of a search target.

The existence probability density g of a search target is expressed by expression 1 in FIG. 10. In expression 1, x, y, and z denote the coordinates (position) of an unmanned vehicle and $x_t$, $y_t$, and $z_t$ denote the x-coordinate, the y-coordinate, and the z-coordinate (position) of the search target.

The existence probability density g of the search target can be described in various ways but herein it is described by using a bell-shaped curve where the position of the search target most recently found corresponds to the peak of the existence probability density g and the farther away from the position, the smaller the existence probability density g. To obtain a more reliable description of the existence probability density g, the existence probability density g may be described by predicting the position of the search target at the present moment from the position of the search target most recently found and assuming that the search target is at the predicted position.

The finding probability $p_i$ of each unmanned vehicle succeeding to find the search target is expressed by expression 2 in FIG. 10. In expression 2, $\psi_i$ is the search effort given to the unmanned vehicle i. The search effort $\psi_i$ may be regarded as an operation amount.

The finding probability $p_i$ often varies according to the environment that each unmanned vehicle is in. In the case of finding a search object in the sea by sonar, for example, it is known that the finding probability $p_i$ can be expressed by expression 3 in FIG. 10. In expression 3, $\gamma_i$ is an amount dependent on radio wave propagation. In other words, it is an amount that varies according to the area of sea that the unmanned vehicle is in. It is preferable to always use a coefficient appropriate for the environment that the unmanned vehicle is in.

The search probability $f_i$ of the search target for each unmanned vehicle can be expressed as the product of the existence probability density g of the search target and the finding probability $p_i$ of the unmanned vehicle as in expression 4 in FIG. 10. In expression 4, $x_i$, $y_i$, and $z_i$ denote the x-coordinate, the y-coordinate, and the z-coordinate (position) of the unmanned vehicle i.

Therefore, the total search probability of the plurality of unmanned vehicles as a whole is expressed by expression 5 in FIG. 10.

It is reasonable to assume that the search effort has a limit when the energy supply for the unmanned vehicle is taken into account. Thus, the search probability needs to be increased as much as possible for the finite search effort. Therefore, the total search probability is to be maximized for a predetermined total search effort input. Herein, a technique of setting a total search effort input per unit time, i.e., a total search effort and maximizing the total search probability will be considered.

In mathematical terms, this is to solve an optimization problem of maximizing the total search probability of expression 5 under the constraint on the total search effort $\Psi$ of expression 6 in FIG. 10.

The coordinated operation information generation unit 114 is a unit that determines, given the limited total search effort $\Psi$ described above, the operation setting value of the unmanned vehicle, by considering which and how far (how long) unmanned vehicle should be operated, to maximize the total search probability for the plurality of unmanned vehicles (unmanned vehicles as a whole). In the above-described example, therefore, the evaluation value relating to the objective of the plurality of unmanned vehicles as a whole is given as the value of expression 4 (search probability $f_i$) and, further, the ancillary information ancillary thereto is the position information of the search target ($x_t$, $y_t$, $z_t$), the position information of the unmanned vehicle ($x_i$, $y_i$, $z_i$), the search effort $\psi_i$, and the like. Herein, the algorism described below has been devised as an algorism for determining the operation setting value.

That is, it is an algorithm that determines the operation amount (search effort $\psi_i$) of the own vehicle in such a way as to maximize the total search probability per unit search effort, taking into account the state of the evaluation function (search probability $f_i$) of neighboring unmanned vehicles. For example, when a unit search effort is inputted and the increment in the total search probability made possible by the own vehicle is greater than the increment made possible by the neighboring unmanned vehicle, then it is determined that a unit search effort will be inputted to the own vehicle in the next control step. Conversely, when the increment made possible by the own vehicle is smaller than the increment made possible by the neighboring unmanned vehicle, then a unit search effort will not be inputted to the own vehicle in the next control step. In other words, it is determined that the own vehicle will not operate. In short, the coordinated operation information generation unit 114 generates an operation setting value of the unmanned vehicle 101, based on a result of a comparison between the evaluation function value relating to the operation amount of the unmanned vehicle 101 and the evaluation function value relating to the operation amount of the unmanned vehicle 102.

The search probability per each unit search effort is equivalent to the derivative of the evaluation function. Therefore, when the operation amount is determined in such a way as to maximize the search probability per unit search effort, the derivatives of the evaluation functions of all the unmanned vehicles will become equal to each other as determination operations are repeated. Therefore, a technique of determining the operation amount in such a way as to equalize the derivatives of the evaluation function is also effective. In other words, the coordinated operation information generation unit 114 generates the operation setting value of the unmanned vehicle 101 in such a way as to equalize the evaluation function value relating to the operation amount of the unmanned vehicle 101 or a value derived from the evaluation function value with the evaluation function value relating to the operation amount of the unmanned vehicle 102 or a value derived from the evaluation function value.

When an unmanned vehicle determines its operation amount, the above-described algorithm does not require the unmanned vehicle to acquire the state information of all other unmanned vehicles with which to coordinate and allows an approach to the total objective by using only the state information of a neighboring unmanned vehicle of which the state information is available.

In controlling an unmanned vehicle, the operation setting value needs to be set not as a scholar quantity but as a vector quantity having three-dimensional directions. Therefore, the operation amount determined by the above-described algorithm needs to be separated into outputs in three-dimensional directions and converted into a final operation setting value. To address this, the operation directions are decided herein as described below, although there are many ways for deciding the operation directions. First, by using the present position of the unmanned vehicle as the starting point, generated is a vector connecting the starting point with the position of the search target. The vector is made into a unit vector (normalized to a vector having a length of 1) for subsequent processing and treated as an operation vector. The operation setting value for each direction is calculated using the operation amount determined above, as the length of the operation vector.

According to the present example embodiment, a control system, an unmanned vehicle, or an interface is actualized that allows an easy development of an application for a group of unmanned vehicles, combining various kinds of unmanned vehicle operable as solo units.

Second Example Embodiment

A second example embodiment of the present invention will be described in detail with reference to the drawings by using an example in which a plurality of unmanned vehicles operate, as a whole, with the search probability of a search target maximizing.

Figure 11:
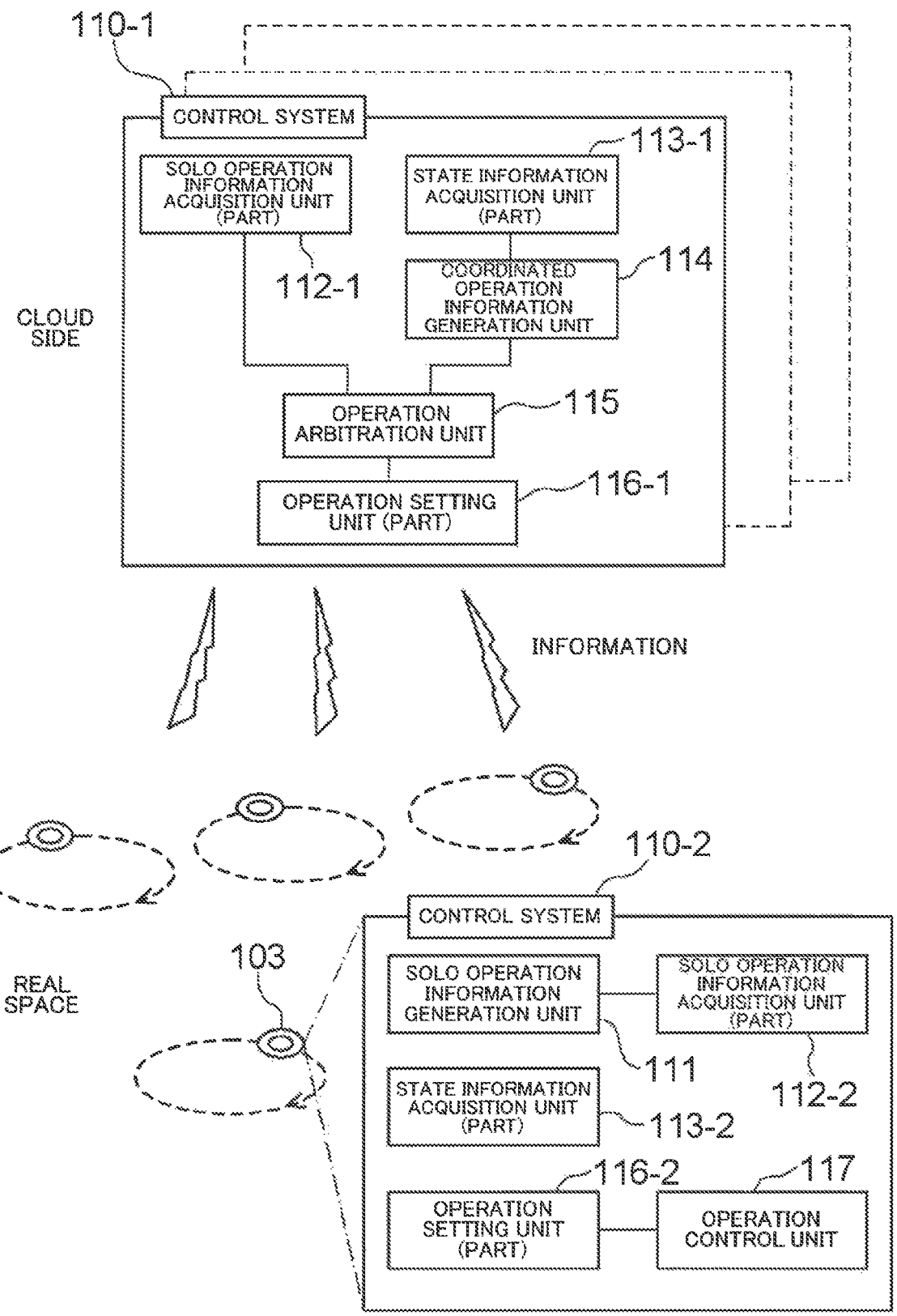
FIG. 11 is a block diagram of a control system according to a second example embodiment of the present invention.

In the present example embodiment, a central management system for a plurality of unmanned vehicles is implemented in a cloud. The present example embodiment is an example of mounting a part of the control system 110 of the first example embodiment in a cloud. FIG. 11 is a schematic diagram of the system. Further, FIGS. 12 and 13 illustrate example hardware configurations.

With reference to FIG. 11, a control system 110-1 mounted in a cloud includes a part of the solo operation information acquisition unit 112 (the communication interface 1122) 112-1, a part of the state information acquisition unit 113 (the communication interface 1135) 113-1, the coordinated operation information generation unit 114, the operation arbitration unit 115, and a part of the operation setting unit 116 (the communication interface 1161) 116-1 of the control system 110 illustrated in FIG. 1.

Figure 12:
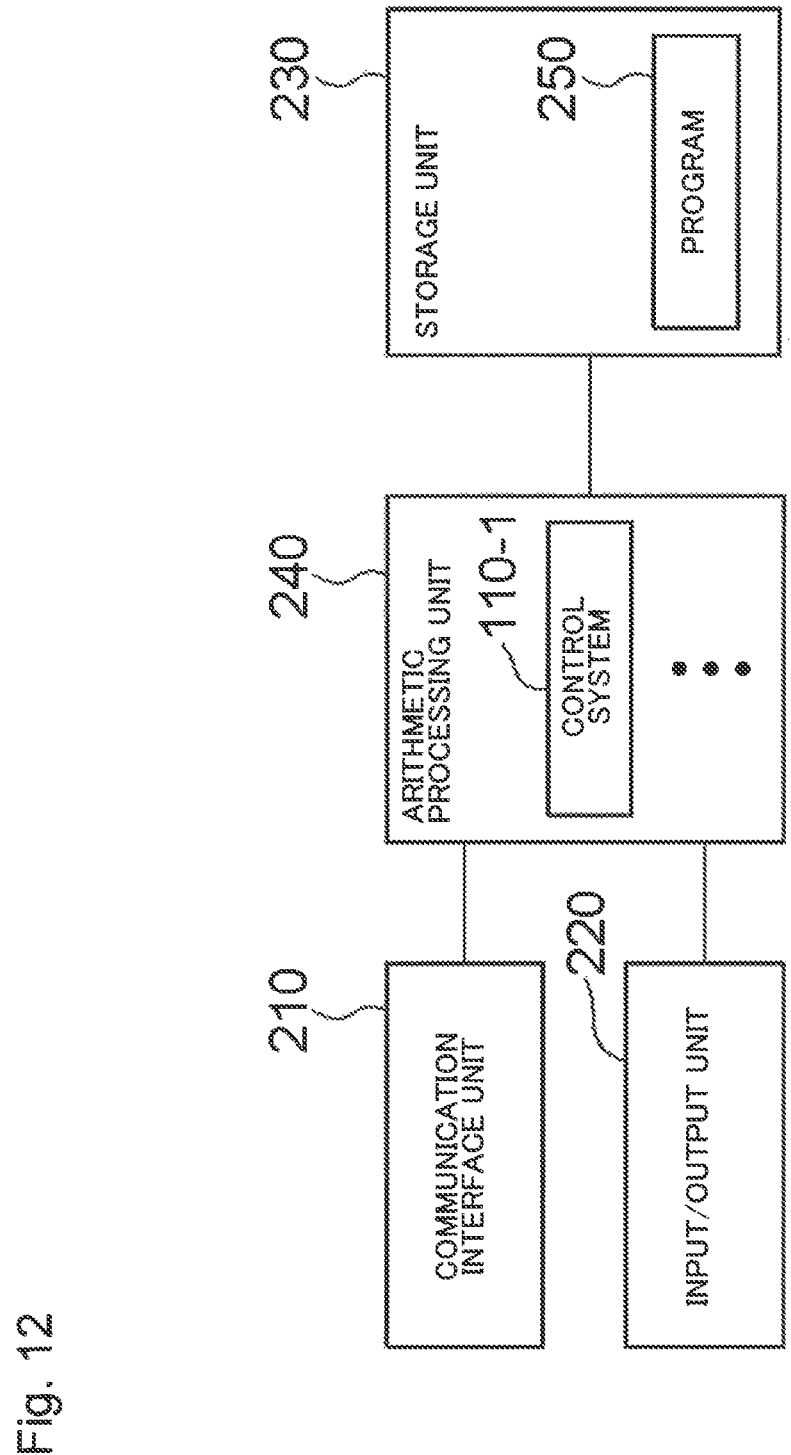
FIG. 12 is a diagram illustrating an example hardware configuration for actualizing the control system mounted in a cloud of the control system according to the second example embodiment of the present invention.
Figure 13:
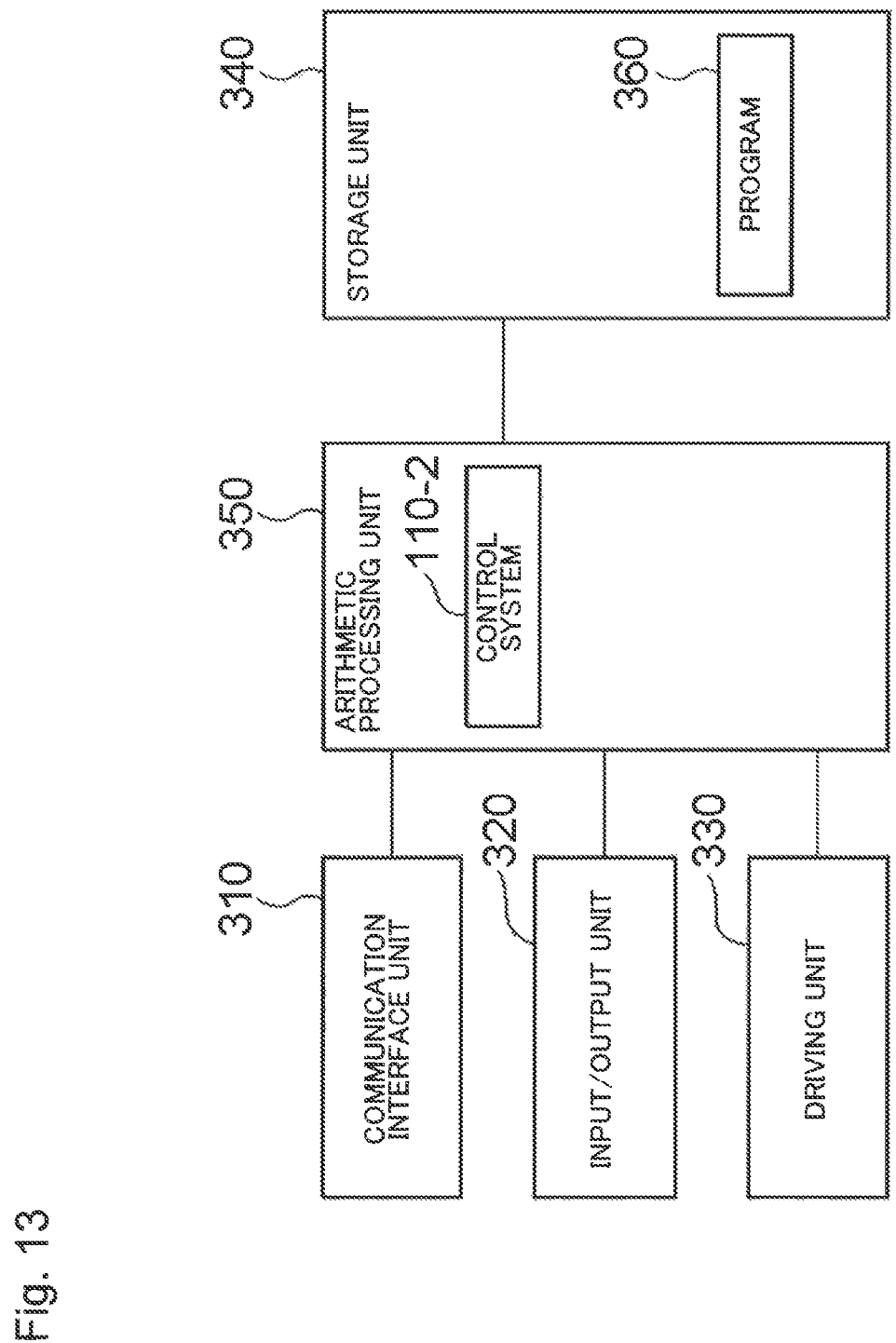
FIG. 13 is a diagram illustrating an example hardware configuration for actualizing the control system mounted on an unmanned vehicle of the control system according to the second example embodiment of the present invention.

With reference to FIG. 12, the hardware for actualizing the control system 110-1 is configured by a communication interface unit 210, an input/output unit 220, a storage unit 230, and an arithmetic processing unit 240. The communication interface unit 210 has a function of communicating with unmanned vehicles by wireless communication. The input/output unit 220 includes an operation input unit such as a keyboard and a mouse and a screen display unit such as a liquid crystal display and has a function of receiving as input the data and instructions given by the operator and of transmitting the data and instructions to the arithmetic processing unit 240 and a function of informing the operator of the information from the arithmetic processing unit 240. The storage unit 230 has a function of storing information and a program 250 necessary for various processing by the arithmetic processing unit 240. The program 250 is a program that actualizes various processing units when it is read and executed by the arithmetic processing unit 240, and the program 250 is read in advance from an external device (not illustrated) or a storage medium (not illustrated) by means of data input/output function such as the communication interface unit 210 and stored in the storage unit 230. The arithmetic processing unit 240 includes a microprocessor such as a CPU and its peripheral circuitry and has a function of actualizing the control system 110-1 illustrated in FIG. 11 by causing the hardware and the program 250 to function together by reading the program 250 from the storage unit 230 and executing the program 250.

Referring to FIG. 11 again, the control system 110-2 mounted on an unmanned vehicle 103 includes the solo operation information generation unit 111, a part of the solo operation information acquisition unit 112 (the communication interface 1121) 112-2, a part of the state information acquisition unit 113 (the acquisition unit 1133 and the communication interface 1134) 113-2, a part of the operation setting unit 116 (the communication interface 1162) 116-2, and the operation control unit 117 of the control system 110 illustrated in FIG. 1.

With reference to FIG. 13, the hardware for actualizing the control system 110-2 is configured by a communication interface unit 310, an input/output unit 320, a driving unit 330, a storage unit 340, and an arithmetic processing unit 350. The communication interface unit 310 has a function of communicating with other devices through wireless communication. The input/output unit 320 and the driving unit 330 are an input/output unit and a driving unit provided for the unmanned vehicle 103. For example, when the unmanned vehicle 103, which is a moving body, is a drone, the input/output unit 320 is configured by a camera, a 3-axis magnetic sensor, a 3-axis gyroscope, an ultrasonic sensor for measuring altitude to ground, and the like. Further, when the unmanned vehicle 103 is a drone, the driving unit 330 is configured by motors that drive the propellers, and the like. The storage unit 340 has a function of storing information and a program 360 necessary for various processing by the arithmetic processing unit 350. The program 360 is a program that actualizes various processing units when it is read and executed by the arithmetic processing unit 350 and the program 360 is read in advance from an external device (not illustrated) or a storage medium (not illustrated) by means of data input/output function such as the communication interface unit 310 and stored in the storage unit 340. The arithmetic processing unit 350 includes a microprocessor such as a CPU and its peripheral circuitry and has a function of actualizing the control system 110-2 illustrated in FIG. 13 by causing the hardware and the program 360 to function together by reading the program 360 from the storage unit 340 and executing the program 360.

The unmanned vehicle 103 used in the present example embodiment is an unmanned vehicle that autonomously operates in the air and searches a search target by radar, or what is called an unmanned air vehicle (UAV). The solo operation information generation unit 111 of this UAV 103 generates some operation setting values of some operation types for an autonomous operation even for the solo operation. The operation setting value of one operation type is for taking an avoidance behavior when there is an obstacle. Further, the operation setting value of another operation type is for taking an autonomous operation to return to the original position, based on GPS information, when the UAV 103 is swayed by a wind (when its position has suddenly changed). When given a desired moving direction and speed by a controller (not illustrated), the UAV 103 operates while taking the above-described autonomous operation into account. In the present example embodiment, the UAV is basically set to stay still in the air by setting the desired moving direction and speed at 0 (0 vector) for the solo UAV operation.

The UAV 103 has a communication interface 1121 as described with reference to FIG. 3 and outputs the operation setting value and its importance generated by the solo operation information generation unit 111 to the control system 110-1 on the cloud side. More specifically, for the two operation types, i.e., obstacle avoidance and position correction (when swayed by the wind), the operation setting value and the importance for each operation type are outputted as values between 0 and 1.

The operation setting value and the importance outputted by each UAV 103 as a solo unit for each operation type are received, through wireless communication, by the communication interface 1122 constituting the part 112-1 of the solo operation information acquisition unit 112 of the control system 110-1 mounted in the cloud and are inputted to the operation arbitration unit 115.

The part 113-1 of the state information acquisition unit 113 of the control system 110-1 mounted in the cloud acquires a state of the unmanned vehicle 103 of which the control system 110-1 is in charge by communicating with the part 113-2 of the state information acquisition unit 113 of the unmanned vehicle 103 and exchanges state information of the unmanned vehicles with the control systems 110-1 that are in charge of the other unmanned vehicles. The state of the unmanned vehicle 103 may be position information of the search target that has been picked up and position information of the unmanned vehicle 103. Thus, in the present example embodiment, each of the control systems 110-1 in charge of each of the unmanned vehicles 103 are virtually disposed in the cloud and a virtual control system 110-1 exchanges information with the virtual control system 110-1 in charge of a neighboring unmanned vehicle 103 as if an unmanned vehicle 103 exchanged information with a neighboring unmanned vehicle 103. Then, each control system 110-1 has a communication interface 1161 as described with reference to FIG. 7 and instructs to control the unmanned vehicle 103 of which the control system 110-1 is in charge by way of the communication interface 1161.

The same function as expression 4 described above was set for the evaluation function to be used in the coordinated operation information generation unit 114 via the state information acquisition unit 113. A Gaussian function was used for the existence probability density g of the search target, wherein the position of the search target most recently found corresponded to the peak of the existence probability density g and the farther away from the position, the smaller the existence probability density g became. Further, the same expression 3 was used for the finding probability $p_i$ for each UAV. Depending on the airspace that each UAV is in, $\gamma_i$ in expression 3 varies. Therefore, a technique was adopted herein in which a database of values of $\gamma_i$ for different airspaces was created in advance and different values were selected for $\gamma_i$ based on the positions that the UAVs were in.

The state information acquisition unit 113 of each UAV appropriately uploads the acquired position information of the search target and the position information of the UAV as ancillary information to be used in the coordinated operation information generation unit 114. The UAVs operate asynchronously, and thus the uploaded pieces of information are also asynchronous. Therefore, even with a central management system in the cloud, not all pieces of information are gathered synchronously. Therefore, a regular optimization calculation of search probability cannot be carried out and hence the above-described algorithm is used for the total optimization of the group of UAVs.

Figure 14:
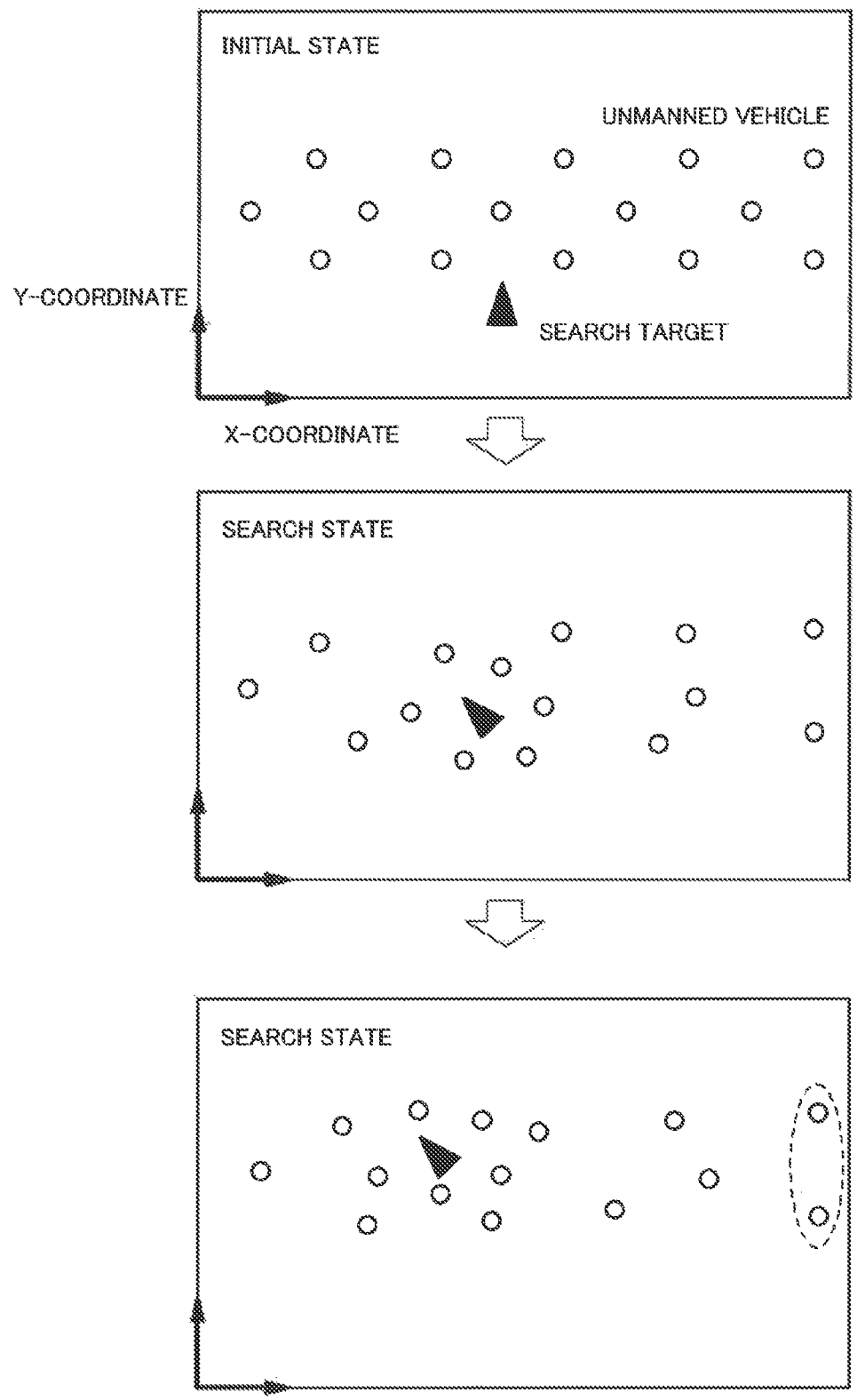
FIG. 14 is a diagram schematically illustrating an example of the operation result of the control system according to the second example embodiment of the present invention.

FIG. 14 schematically illustrates an example of the actual operation result. In this example, there was no obstacle or wind, basically no autonomous operation as a solo unit was carried out, and a coordinated operation by the plurality of UAVs was expected. The group of UAVs formed a desired formation (initial state) in advance and the search target approached the UAVs. The search target is denoted by a triangle and the UAVs are denoted by circles. These drawings indicate time passage from the upper to the lower. The UAVs approached the search target in response to the movement of the search target in such a way as to surround the search target and thus it can be seen that the UVAs succeeded in tracking the search target. The UAVs positioned away from the search target (e.g., the two UAVs on the right side encircled with a dotted line) did not operate and thus it can be seen that the UAVs carried out no unnecessary operation.

The total search probability was evaluated during the above-described operation. The increase in the search probability is made possible by the function for setting the evaluation function and the function for generating the operation amount, these functions being performed by the coordinated operation information generation unit 114. Hence, a comparison was made between the case in which these two functions were deliberately stopped and the present example embodiment. The comparison was made as to the total search probability per unit search effort. Since the search probability increases as the input of the search effort increases in principle, it is necessary to make the comparison by using values per search effort input (per unit search effort). When the function for setting the evaluation function and the function for generating the operation amount were stopped, all UAV were controlled in such a way that they gradually approach the search target. The comparison between the two techniques revealed that the control system according to the present example embodiment had about 30% higher total search probability (per unit search effort) on average. Further, it can be seen that no autonomous operation of the UAVs as single units was carried out and thus a good coordinated operation was performed.

Figure 15:
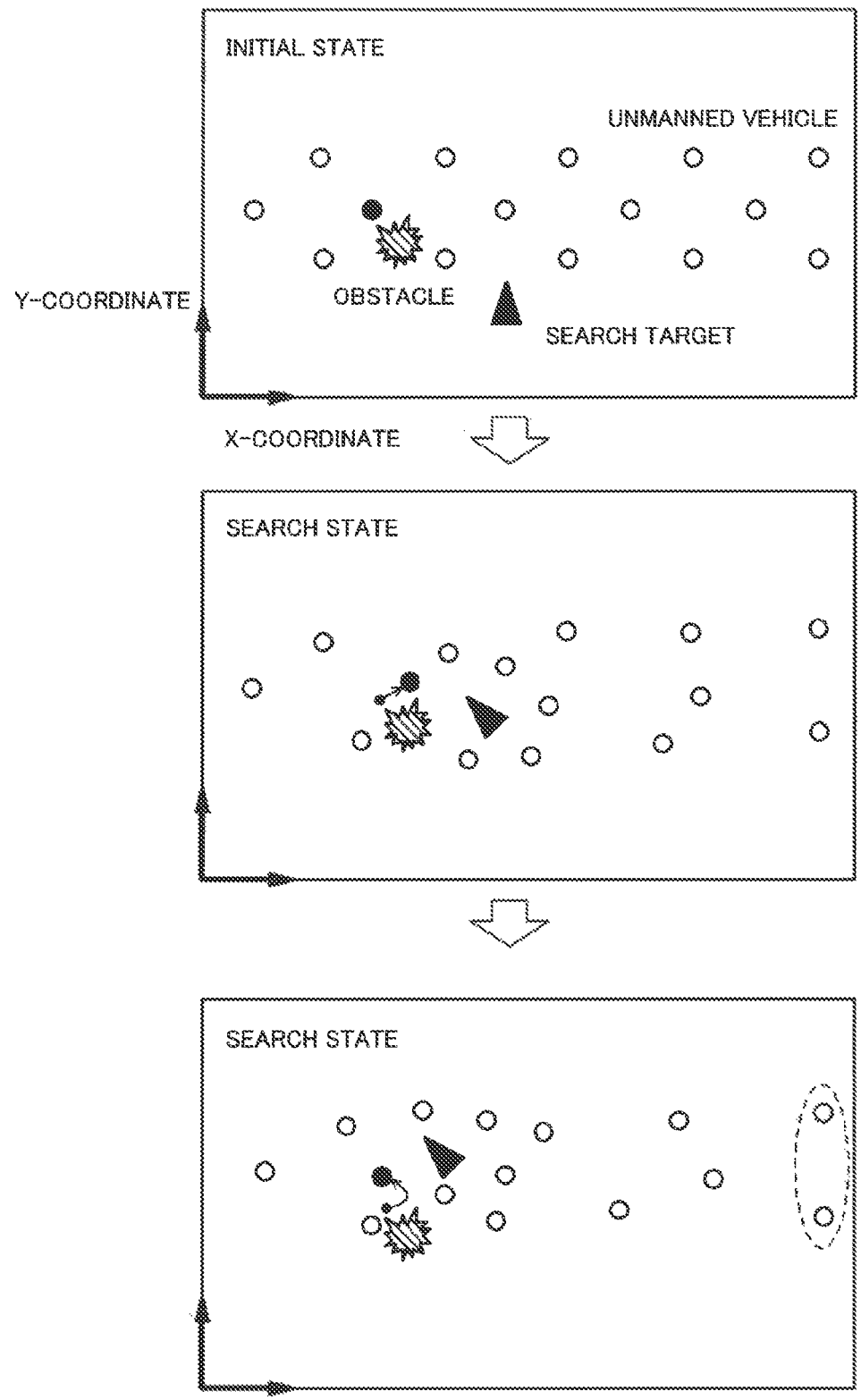
FIG. 15 is a diagram schematically illustrating another example of the operation result of the control system according to the second example embodiment of the present invention.

FIG. 15 schematically illustrates another example of the actual operation result. In this example, there was an obstacle and it was predicted that, with a control taking only the coordinated operation as illustrated in FIG. 14 into account, the UAV denoted by the black circle would crash into the obstacle. The scenario was exactly the same as in FIG. 14, only except for the presence of an obstacle. With reference to FIG. 15, it can be seen that the UAV in question, denoted by the black circle, avoided the obstacle first and tracked the search target in coordination with other UAVs when there was no longer a risk of crashing into the obstacle.

The result shows that the autonomy as solo units and the autonomy of the group in coordinated operation are appropriately arbitrated when necessary.

As describe above, according to the present example embodiment, unmanned vehicles that autonomously operate as solo units can be used with a group control application while maintaining their autonomous operation characteristics as solo units.

Third Example Embodiment

Figure 16:
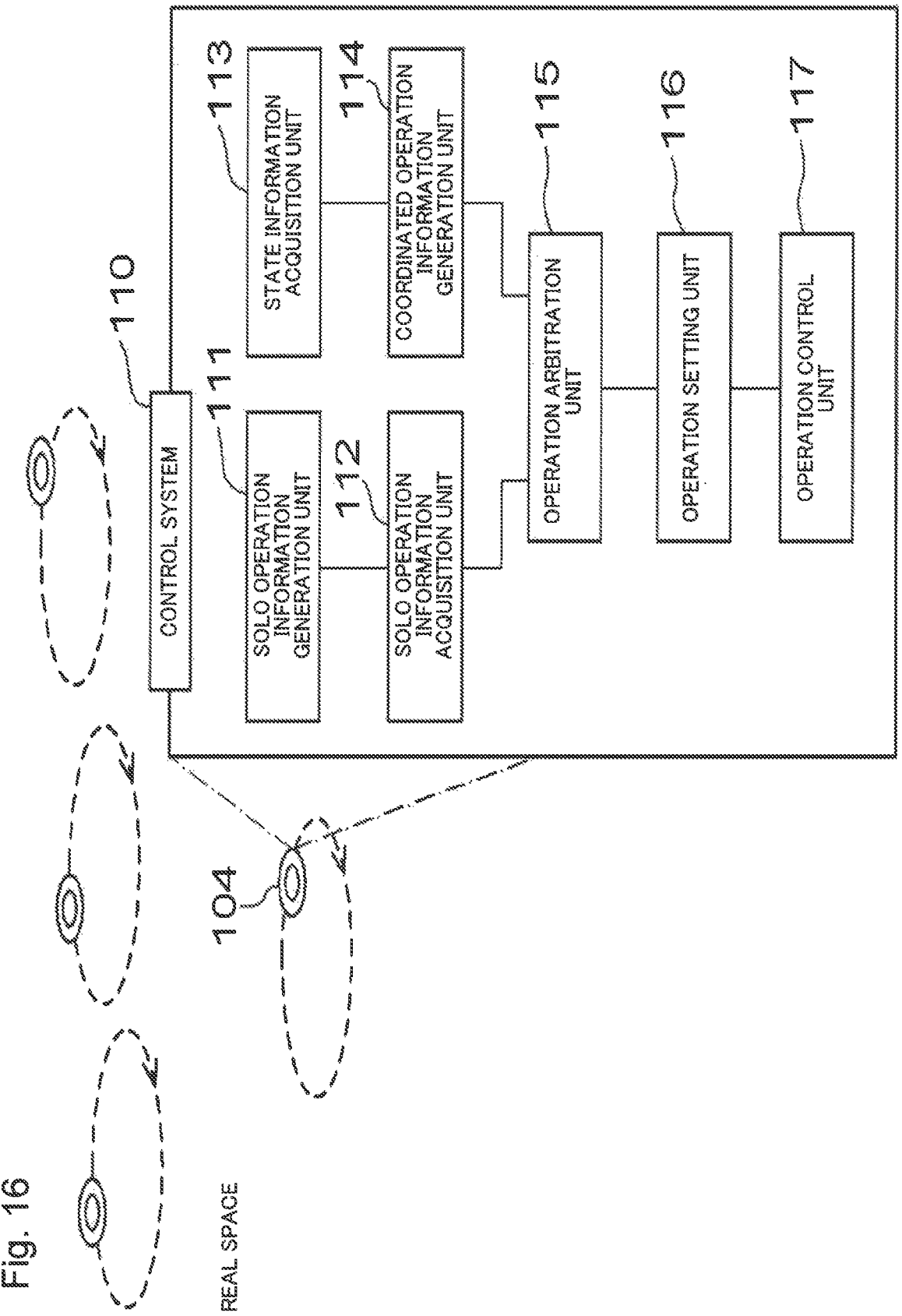
FIG. 16 is a block diagram of a control system according to a third example embodiment of the present invention.

In the present example embodiment, all elements of the control system 110 are implemented in each unmanned vehicle. FIG. 16 is a schematic view of the control system mounted on an unmanned vehicle 104. The implemented control system 110 is the same as illustrated in FIG. 1.

Figure 17:
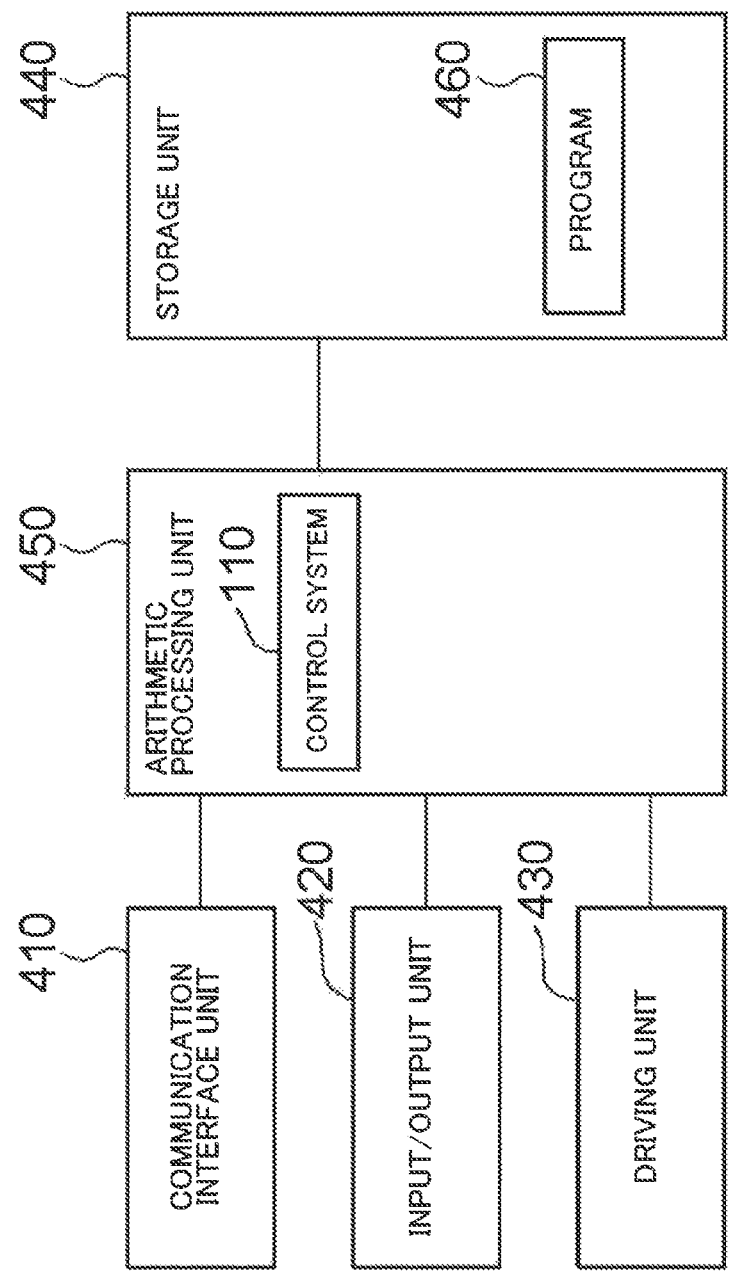
FIG. 17 is a diagram illustrating an example hardware configuration for actualizing the control system according to the third example embodiment of the present invention.

With reference to FIG. 17, the hardware for actualizing the control system 110 is configured by a communication interface unit 410, an input/output unit 420, a driving unit 430, a storage unit 440, and an arithmetic processing unit 450. The communication interface unit 410 has a function of communicating with another device through wireless communication. The input/output unit 420 and the driving unit 430 are an input/output unit and a driving unit provided for the unmanned vehicle 104, which is a moving body. For example, when the unmanned vehicle 104 is a drone, the input/output unit 420 and the driving unit 430 are configured similarly to the input/output unit 320 and the driving unit 330 described with respect to the second example embodiment. The storage unit 440 has a function of storing information and a program 460 necessary for the various processing by the arithmetic processing unit 450. The program 460 is a program that actualizes various processing units when it is read and executed by the arithmetic processing unit 450, and the program 460 is read in advance from an external device (not illustrated) or a storage medium (not illustrated) by means of data input/output function such as the communication interface unit 410 and stored in the storage unit 440. The arithmetic processing unit 450 includes a microprocessor such as a CPU and its peripheral circuitry and has a function of actualizing the control system 110 illustrated in FIG. 16 by causing the hardware and the program 460 to function together by reading the program 460 from the storage unit 440 and executing the program 460.

In the present example embodiment, each unmanned vehicle 104 exchanges information with a neighboring unmanned vehicle 104 with which it can communicate, and operates autonomously and dispersedly in accordance with the instruction by the control system 110 mounted therein. In the present example embodiment, a case is assumed in which it is difficult for the group of unmanned vehicles to obtain information from the field where the unmanned vehicles operate. The case is also assumed in which it is desirable that the group of unmanned vehicles operate autonomously and dispersedly. Such a case very often happens in practical applications. Further, this example embodiment is also effective when it is difficult to utilize a central management system or when the central management system has failed to operate.

All the conditions for the unmanned vehicles 104, the evaluation function and the like used in the present example embodiment are similar to those in the second example embodiment. The main difference concerns whether or not the unmanned vehicles 104 transmit and receive information to and from the central management system. In the present example embodiment, the unmanned vehicles 104 do not transmit or receive information. The function for acquiring the position of the search target is mounted in the state information acquisition unit 113 of each unmanned vehicle 104. The information on the search target is exchanged with a neighboring unmanned vehicle 104.

Experiments were conducted to ascertain whether or not a search target similar to the one in the second example embodiment can be tracked in the present example embodiment and the search target was successfully tracked as in the second example embodiment. Further, the total search probability (per unit search effort) was evaluated as in the second example embodiment. As in the second example embodiment, the total search probability (per unit search effort) was 30% higher in the present example embodiment. Further, when an obstacle was placed as in the second example embodiment, the control system autonomously arbitrated between the obstacle avoidance behavior of the solo units and the coordinated operation of the group, resulting in a successful operation in the present example embodiment as in the second example embodiment.

The present example embodiment has demonstrated that the control system of the present invention works effectively even when the control system is mounted in each unmanned vehicle 104 and performs control of each one from it.

Fourth Example Embodiment

In the present example embodiment, a basic configuration and operation of the moving body control system of the present invention will be described.

Figure 18:
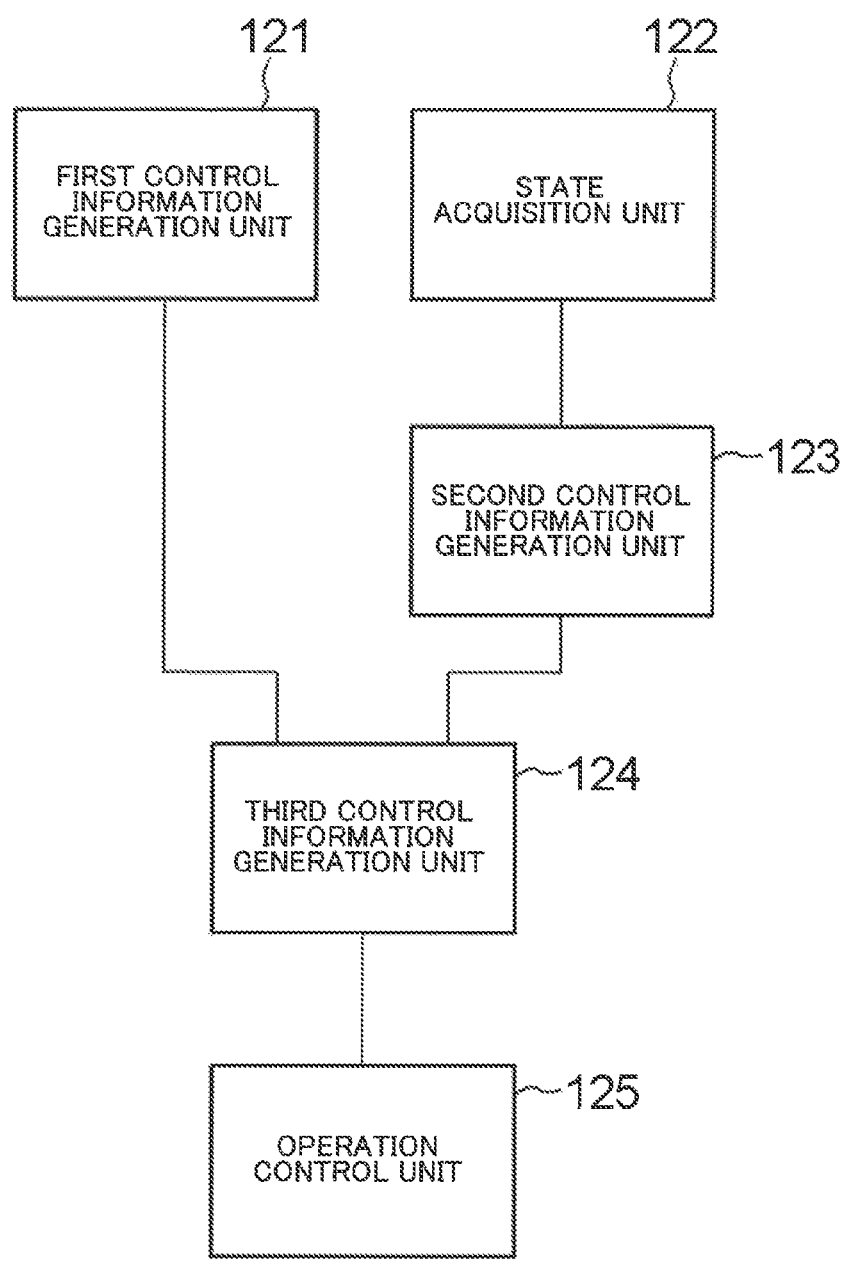
FIG. 18 is a block diagram of a control system according to a fourth example embodiment of the present invention.

With reference to FIG. 18, the moving body control system 120 according to the present example embodiment is a system for controlling a first moving body and includes a first control information generation unit 121, a state acquisition unit 122, a second control information generation unit 123, a third control information generation unit 124, and an operation control unit 125.

The first control information generation unit 121 has a function of generating first control information for operating the first moving body as a solo unit. The state acquisition unit 122 has a function of acquiring states of the first moving body and a second moving body not illustrated in FIG. 18. The second control information generation unit 123 has a function of generating second control information for operating the first moving body in coordination with the second moving body, based on the states. The third control information generation unit 124 has a function of generating third control information from the first control information and the second control information. The operation control unit 125 has a function of controlling the first moving body in accordance with the third control information. These units correspond to the solo operation information generation unit 111, the state information acquisition unit 113, the coordinated operation information generation unit 114, the operation arbitration unit 115, and the operation control unit 117 in the first example embodiment.

The moving body control system 120 according to the present example embodiment configured as described above functions as follows. That is, first of all, the first control information generation unit 121 generates first control information for operating the first moving body as a solo unit. Next, the state acquisition unit 122 acquires states of the first moving body and the second moving body, and the second control information generation unit 123 generates second control information for operating the first moving body in coordination with the second moving body, based on the states. Next, the third control information generation unit 124 generates third control information from the first control information and the second control information. The operation control unit 125 then controls the operation of the first moving body in accordance with the third control information.

Thus, in the present example embodiment, it is not necessary to individually design the second control information generation unit 123 according to the first control information generation unit 121, the second control information generation unit 123 being the functional part for operating the first moving body in coordination with the second moving body, and the first control information generation unit 121 being the functional part for operating the first moving body as a solo unit. This is because the first control information generation unit 121 and the second control information generation unit 123 are independent of each other.

Other Example Embodiments of the Invention

In the second example embodiment, the central management system is implemented in a cloud but the central management system may be established as a special system. For example, a central management system may be established and built on a seashore and instructions may be sent to a plurality of UAVs therefrom. Further, a central management system may be set up on a mother ship that commands a plurality of UAVs.

Further, in the second example embodiment and the third example embodiment, the examples were described with respect to UAVs but the present invention can be applied to unmanned vehicles of aircraft type that fly, unmanned vehicles that run on the ground, and the like, irrespective of the types of the unmanned vehicle.

Further, in the first to third example embodiment, a control for maximizing the search probability is performed with an objective of tracking a search target. However, the objective or the value to be maximized is not limited thereto and may be altered as appropriate. For example, a control may be performed in order to find as many dispersed and static search targets as possible in a most energy efficient manner. Further, a control may be performed in order to form a formation of unmanned vehicles mounted with a wireless device for the purpose of transmitting information at a desired transfer rate and as widely as possible. In other words, the present invention can be used effectively for applications in which a plurality of unmanned vehicles are given an objective and maximize a value.

Further, in the first to third example embodiment, a plurality of moving bodies are operated in coordination, with an objective of tracking a search target. However, the objective of a coordinated operation is not limited thereto and may be altered as appropriate. For example, it may be simply a coordinated operation for arranging the moving bodies in a formation. More specifically, the present invention can be used, for example, for controlling the first moving body in such a way that the first moving body moves by following the second moving body in order to maintain the predetermined position behind the second moving body. In such a case, the state information acquisition unit 113 acquires the position, moving speed, and moving direction of the first moving body and the position, moving speed, and moving direction of the second moving body. Further, the coordinated operation information generation unit 114 generates an operation setting value for operating the first moving body in coordination with the second moving body in such a way that the first moving body is positioned at a predetermined position relative to the second moving body.

Further, in the above-described example embodiments, the second moving body with which the first moving body coordinates is an unmanned vehicle but the second moving body may be a manned vehicle.

The whole or part of the example embodiments disclosed above can be described as, but not limited to, the following supplementary notes.

[Supplementary Note 1]

A moving body being a first moving body, comprising:

a first control information generation unit configured to generate first control information for operating the first moving body as a solo unit;

a state acquisition unit configured to acquire states of the first moving body and at least one second moving body;

a second control information generation unit configured to generate second control information for operating the first moving body in coordination with the at least one second moving body, based on the acquired states;

a third control information generation unit configured to generate third control information from the first control information and the second control information; and an operation control unit configured to control an operation of the first moving body in accordance with the third control information.

[Supplementary Note 2]

The moving body according to Supplementary note 1, wherein the state acquisition unit acquires a first evaluation function value relating to an operation amount of the first moving body and a second evaluation function value relating to an operation amount of the second moving body.

[Supplementary Note 3]

The moving body according to Supplementary note 2, wherein the second control information generation unit generates the second control information, based on a result of comparison of the first evaluation function value relating to the operation amount of the first moving body with the second evaluation function value relating to the operation amount of the second moving body.

[Supplementary Note 4]

The moving body according to Supplementary note 2, wherein the second control information generation unit generates the second control information in such a way as to equalize the first evaluation function value relating to the operation amount of the first moving body with the second evaluation function value relating to the operation amount of the second moving body or to equalize a value derived from the first evaluation function value with a value derived from the second evaluation function value.

[Supplementary Note 5]

The moving body according to any one of Supplementary notes 2 to 4, wherein the first evaluation function value represents a search probability of a search target for the first moving body, and the second evaluation function value represents a search probability of the search target for the second moving body.

[Supplementary Note 6]

The moving body according to any one of Supplementary notes 1 to 5, wherein at least one of the first control information and the second control information includes an operation setting value and an importance for each operation type of the first moving body.

[Supplementary Note 7]

The moving body according to Supplementary note 6, wherein the third control information generation unit generates, based on the operation setting value and the importance for each operation type of the first moving body, at least one of a first operation setting value for operating the first moving body as a solo unit and a first importance indicating an importance of the first operation setting value, and a second operation setting value for operating the first moving body in coordination with the at least one second moving body and a second importance indicating an importance of the second operation setting value.

[Supplementary Note 8]

The moving body according to any one of Supplementary note 1, wherein the first control information includes a first operation setting value and a first importance indicating an importance of the first operation setting value, the second control information includes a second operation setting value and a second importance indicating an importance of the second operation setting value, the third control information includes a third operation setting value, and the third control information generation unit determines the third operation setting value, based on the first operation setting value, the first importance, the second operation setting value, and the second importance.

[Supplementary Note 9]

The moving body according to Supplementary note 1, wherein the state acquisition unit acquires a position, a moving speed, and a moving direction of the first moving body, and a position, a moving speed, and a moving direction of the second moving body.

[Supplementary Note 10]

The moving body according to Supplementary note 9, wherein the second control information generation unit generates the second control information in such a way that the first moving body and the second moving body are in a predetermined positional relation.

[Supplementary Note 11]

The moving body according to any one of Supplementary notes 1 to 10, further comprising an acquisition unit configured to acquire the first control information from the first moving body.

[Supplementary Note 12]

The moving body according to any one of Supplementary notes 1 to 11, further comprising a setting unit configured to set the third control information to the first moving body.

[Supplementary Note 13]

A moving body comprising a first interface for outputting first control information for operating the moving body as a solo unit, to an outside of the moving body.

[Supplementary Note 14]

The moving body according to Supplementary note 13, wherein the first control information includes a first operation setting value and a first importance indicating an importance of the first operation setting value.

[Supplementary Note 15]

The moving body according to Supplementary note 14, wherein the first operation setting value includes an operation setting value and an importance for each operation type of the moving body.

[Supplementary Note 16]

The moving body according to any one of Supplementary notes 13 to 15, further comprising a second interface for receiving, as input, a second operation setting value to be used in place of the first operation setting value, from an outside of the moving body.

[Supplementary Note 17]

An interface device of a moving body, comprising a first interface for outputting first control information for operating the moving body as a solo unit, to an outside of the moving body.

[Supplementary Note 18]

The interface device according to Supplementary note 17, wherein the first control information includes a first operation setting value and a first importance indicating an importance of the first operation setting value.

[Supplementary Note 19]

The interface device according to Supplementary note 18, wherein the first operation setting value includes an operation setting value and an importance for each operation type of the moving body.

[Supplementary Note 20]

The interface device according to any one of Supplementary notes 17 to 19, further comprising a second interface for receiving, as input, a second operation setting value to be used in place of the first operation setting value, from an outside of the moving body.

[Supplementary Note 21]

A moving body control method being a method of controlling a first moving body, comprising:

generating first control information for operating the first moving body as a solo unit;

acquiring states of the first moving body and a second moving body;

generating second control information for operating the first moving body in coordination with the second moving body, based on the acquired states;

generating third control information from the first control information and the second control information; and controlling an operation of the first moving body in accordance with the third control information.

[Supplementary Note 22]

A program that causes a computer mounted on a first moving body to execute a function as:

a first control information generation unit configured to generate first control information for operating the first moving body as a solo unit;

a state acquisition unit configured to acquire states of the first moving body and at least one second moving body;

a second control information generation unit configured to generate second control information for operating the first moving body in coordination with the at least one second moving body, based on the acquired states;

a third control information generation unit configured to generate third control information from the first control information and the second control information; and an operation control unit configured to control an operation of the first moving body in accordance with the third control information.

[Supplementary Note 23]

A moving body control system for controlling a first moving body, comprising:

a first control information generation unit configured to generate first control information for operating the first moving body as a solo unit;

a state acquisition unit configured to acquire states of the first moving body and at least one second moving body;

a second control information generation unit configured to generate second control information for operating the first moving body in coordination with the second moving body, based on the acquired states;

a third control information generation unit configured to generate third control information from the first control information and the second control information; and an operation control unit configured to control an operation of the first moving body in accordance with the third control information.

[Supplementary Note 24]

The moving body control system according to Supplementary note 23, wherein the state acquisition unit acquires a first evaluation function value relating to an operation amount of the first moving body and a second evaluation function value relating to an operation amount of the second moving body.

[Supplementary Note 25]

The moving body control system according to Supplementary note 24, wherein the second control information generation unit generates the second control information, based on a result of comparison of the first evaluation function value relating to the operation amount of the first moving body with the second evaluation function value relating to the operation amount of the second moving body.

[Supplementary Note 26]

The moving body control system according to Supplementary note 24, wherein the second control information generation unit generates the second control information in such a way as to equalize the first evaluation function value relating to the operation amount of the first moving body with the second evaluation function value relating to the operation amount of the second moving body or to equalize a value derived from the first evaluation function value with a value derived from the second evaluation function value.

[Supplementary Note 27]

The moving body control system according to any one of Supplementary notes 24 to 26, wherein the first evaluation function value represents a search probability of a search target for the first moving body, and the second evaluation function value represents a search probability of the search target for the second moving body.

[Supplementary Note 28]

The moving body control system according to any one of Supplementary notes 23 to 27, wherein at least one of the first control information and the second control information includes an operation setting value and an importance for each operation type of the first moving body.

[Supplementary Note 29]

The moving body control system according to Supplementary note 28, wherein the third control information generation unit generates, based on the operation setting value and the importance for each operation type of the first moving body, at least one of a first operation setting value for operating the first moving body as a solo unit and a first importance indicating an importance of the first operation setting value, and a second operation setting value for operating the first moving body in coordination with the second moving body and a second importance indicating an importance of the second operation setting value.

[Supplementary Note 30]

The moving body control system according to Supplementary note 23, wherein the first control information includes a first operation setting value and a first importance indicating an importance of the first operation setting value, the second control information includes a second operation setting value and a second importance indicating an importance of the second operation setting value, the third control information includes a third operation setting value, and the third control information generation unit determines the third operation setting value, based on the first operation setting value, the first importance, the second operation setting value, and the second importance.

[Supplementary Note 31]

The moving body control system according to Supplementary note 23, wherein the state acquisition unit acquires a position, a moving speed, and a moving direction of the first moving body, and a position, a moving speed, and a moving direction of the second moving body.

[Supplementary Note 32]

The moving body control system according to Supplementary note 31, wherein the second control information generation unit generates the second control information in such a way that the first moving body and the second moving body are in a predetermined positional relation.

[Supplementary Note 33]

The moving body control system according to any one of Supplementary notes 23 to 32, further comprising an acquisition unit configured to acquire the first control information from the first moving body.

[Supplementary Note 34]

The moving body control system according to any one of Supplementary notes 23 to 33, further comprising a setting unit configured to set the third control information to the first moving body.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-122465, filed on Jun. 21, 2016, the disclosure of which is incorporated herein in its entirety by reference.

INDUSTRIAL APPLICABILITY

The present invention may be used for controlling a moving body and, in particular, may be used for a system of operating a group of unmanned vehicles for the purpose of achieving an objective while maximizing a value as the group of unmanned vehicles as a whole by using a plurality of autonomously operable moving bodies.

REFERENCE SIGNS LIST

101 unmanned vehicle
102 unmanned vehicle
103 unmanned vehicle (UAV)
104 unmanned vehicle
110 control system 110-1 control system
110-2 control system
111 solo operation information generation unit
112 solo operation information acquisition unit
112-1 part of solo operation information acquisition unit
112-2 part of solo operation information acquisition unit
113 state information acquisition unit
113-1 part of state information acquisition unit
113-2 part of state information acquisition unit
114 coordinated operation information generation unit
115 operation arbitration unit
116 operation setting unit
116-1 part of operation setting unit
116-2 part of operation setting unit
117 operation control unit
210 communication interface unit
220 input/output unit
230 storage unit
240 arithmetic processing unit
250 program
310 communication interface unit
320 input/output unit
330 driving unit
340 storage unit
350 arithmetic processing unit
360 program
410 communication interface unit
420 input/output unit
430 driving unit
440 storage unit
450 arithmetic processing unit
460 program
1121 communication interface
1122 communication interface
1123 interface
1131 acquisition unit
1132 communication interface
1133 acquisition unit
1134 communication interface
1135 communication interface
1161 communication interface
1162 communication interface
1163 interface

What is claimed is:

1. A moving body being a first moving body, comprising:
a first control information generation unit configured to generate first control information for operating the first moving body as a solo unit;
a state acquisition unit configured to acquire states of the first moving body and at least one second moving body;
a second control information generation unit configured to generate second control information for operating the first moving body in coordination with the at least one second moving body, based on the acquired states;
a third control information generation unit configured to generate third control information from the first control information and the second control information; and
an operation control unit configured to control an operation of the first moving body in accordance with the third control information.

2. The moving body according to claim 1, wherein the state acquisition unit acquires a first evaluation function value relating to an operation amount of the first moving body and a second evaluation function value relating to an operation amount of the second moving body.

3. The moving body according to claim 2, wherein the second control information generation unit generates the second control information, based on a result of comparison of the first evaluation function value relating to the operation amount of the first moving body with the second evaluation function value relating to the operation amount of the second moving body.

4. The moving body according to claim 2, wherein the second control information generation unit generates the second control information in such a way as to equalize the first evaluation function value relating to the operation amount of the first moving body with the second evaluation function value relating to the operation amount of the second moving body or to equalize a value derived from the first evaluation function value with a value derived from the second evaluation function value.

5. The moving body according to claim 2, wherein the first evaluation function value represents a search probability of a search target for the first moving body, and
the second evaluation function value represents a search probability of the search target for the second moving body.

6. The moving body according to claim 1, wherein at least one of the first control information and the second control information includes an operation setting value and an importance for each operation type of the first moving body.

7. The moving body according to claim 6, wherein the third control information generation unit generates, based on the operation setting value and the importance for each operation type of the first moving body, at least one of
a first operation setting value for operating the first moving body as a solo unit and a first importance indicating an importance of the first operation setting value, and
a second operation setting value for operating the first moving body in coordination with the at least one second moving body and a second importance indicating an importance of the second operation setting value.

8. The moving body according to claim 1, wherein the first control information includes a first operation setting value and a first importance indicating an importance of the first operation setting value,
the second control information includes a second operation setting value and a second importance indicating an importance of the second operation setting value,
the third control information includes a third operation setting value, and
the third control information generation unit determines the third operation setting value, based on the first operation setting value, the first importance, the second operation setting value, and the second importance.

9. The moving body according to claim 1, wherein the state acquisition unit acquires a position, a moving speed, and a moving direction of the first moving body, and a position, a moving speed, and a moving direction of the second moving body.

10. The moving body according to claim 9, wherein the second control information generation unit generates the second control information in such a way that the first moving body and the second moving body are in a predetermined positional relation.

11. The moving body according to claim 1, further comprising
an acquisition unit configured to acquire the first control information from the first moving body.

12. The moving body according to claim 1, further comprising
a setting unit configured to set the third control information to the first moving body.

13. A moving body control method being a method of controlling a first moving body, comprising:
generating, by a computer mounted on the first moving body, first control information for operating the first moving body as a solo unit;
acquiring, by the computer, states of the first moving body and a second moving body;
generating, by the computer, second control information for operating the first moving body in coordination with the second moving body, based on the acquired states;
generating, by the computer, third control information from the first control information and the second control information; and
controlling, by the computer, an operation of the first moving body in accordance with the third control information.

14. A non-transitory storage medium storing a program that causes a computer mounted on a first moving body to execute:
first control information generation processing of generating first control information for operating the first moving body as a solo unit;
state acquisition processing of acquiring states of the first moving body and at least one second moving body;
second control information generation processing of generating second control information for operating the first moving body in coordination with the at least one second moving body, based on the acquired states;
third control information generation processing of generating third control information from the first control information and the second control information; and
operation control processing of controlling an operation of the first moving body in accordance with the third control information.

* * * * *